United States Patent
Yoda et al.

(10) Patent No.: US 12,325,802 B2
(45) Date of Patent: Jun. 10, 2025

(54) WATER-BASED INKJET YELLOW INK, INK SET, AND METHOD FOR PRODUCING PRINTED MATTER

(71) Applicants: artience Co., Ltd., Tokyo (JP); TOYOCOLOR CO., LTD.

(72) Inventors: Atsushi Yoda, Tokyo (JP); Kazuhiro Jonai, Tokyo (JP); Norio Suzuki, Tokyo (JP)

(73) Assignees: artience Co., Ltd., Tokyo (JP); TOYOCOLOR CO., LTD, Tokyo (JP)

( * ) Notice: Subject to any disclaimer, the term of this patent is extended or adjusted under 35 U.S.C. 154(b) by 727 days.

(21) Appl. No.: 17/414,500

(22) PCT Filed: Dec. 16, 2019

(86) PCT No.: PCT/JP2019/049201
§ 371 (c)(1),
(2) Date: Jun. 16, 2021

(87) PCT Pub. No.: WO2020/129904
PCT Pub. Date: Jun. 25, 2020

(65) Prior Publication Data
US 2022/0073772 A1 Mar. 10, 2022

(30) Foreign Application Priority Data
Dec. 17, 2018 (JP) ................................. 2018-235199

(51) Int. Cl.
| | | |
|---|---|---|
| *C09D 11/40* | (2014.01) | |
| *C09B 29/20* | (2006.01) | |
| *C09B 57/04* | (2006.01) | |
| *C09D 11/033* | (2014.01) | |
| *C09D 11/037* | (2014.01) | |
| *C09D 11/107* | (2014.01) | |
| *C09D 11/322* | (2014.01) | |
| *B41M 5/00* | (2006.01) | |

(52) U.S. Cl.
CPC .............. *C09D 11/40* (2013.01); *C09B 29/20* (2013.01); *C09B 57/04* (2013.01); *C09D 11/033* (2013.01); *C09D 11/037* (2013.01); *C09D 11/107* (2013.01); *C09D 11/322* (2013.01); *B41M 5/0023* (2013.01)

(58) Field of Classification Search
CPC ..... C09D 11/40; C09D 11/033; C09D 11/037; C09D 11/322; C09B 57/04
USPC ........................................................ 524/94
See application file for complete search history.

(56) References Cited

U.S. PATENT DOCUMENTS

| | | | |
|---|---|---|---|
| 7,867,327 B2 | 1/2011 | Sano et al. | |
| 7,931,743 B2 | 4/2011 | Saito et al. | |
| 8,016,931 B2 | 9/2011 | Mizutani et al. | |
| 9,580,576 B2 | 2/2017 | Mori et al. | |
| 2009/0181219 A1 | 7/2009 | Saito et al. | |
| 2017/0051170 A1* | 2/2017 | Nakagawa | C09D 11/38 |

FOREIGN PATENT DOCUMENTS

| | | |
|---|---|---|
| CN | 104144988 A | 11/2014 |
| CN | 105980490 A | 9/2016 |
| EP | 3 875 555 A1 | 9/2021 |
| JP | 11-172180 A | 6/1999 |
| JP | 2000-290545 A | 10/2000 |
| JP | 2002-212470 A | 7/2002 |
| JP | 2003-313480 A | 11/2003 |
| JP | 2006-334940 A | 12/2006 |
| JP | 2007-145887 A | 6/2007 |
| JP | 2008-291103 A | 12/2008 |
| JP | 2009-24072 A | 2/2009 |
| JP | 2009-167265 A | 7/2009 |
| JP | 2009-179722 A | 8/2009 |
| JP | 2010-043149 A | 2/2010 |
| JP | 2010-235937 A | 10/2010 |
| JP | 2015-093950 A | 5/2015 |
| JP | 2017-155092 A | 9/2017 |
| JP | 6592869 B1 | 10/2019 |

OTHER PUBLICATIONS

Extended European Search Report dated Jan. 10, 2022 from the European Patent Office in EP Application No. 19898925.3.
Chinese Office Action dated Dec. 27, 2022, in Chinese Application No. 2019800833533.
Communication dated Jul. 13, 2023 issued in European Patent Application No. 19 898 925.3.
Office Action issued on Sep. 24, 2019 in counterpart JP Application No. 2018-235199.
International Search Report for PCT/JP2019/049201, dated Mar. 10, 2020.
Decision of Rejection of the Application dated on Aug. 4, 2023 issued in Chinese Application No. 201980083353.3.

* cited by examiner

*Primary Examiner* — Ruiyun Zhang
(74) *Attorney, Agent, or Firm* — Sughrue Mion, PLLC

(57) ABSTRACT

One embodiment relates to a water-based inkjet yellow ink containing a yellow pigment (A) having a specific partial structure, an organic solvent, a basic organic compound, and water, wherein an amount of the yellow pigment (A) is 1 to 10% by mass of a total mass of the water-based inkjet yellow ink, the basic organic compound contains 0.1 to 1.25% by mass of a basic organic compound (B) having a pKa value of 9.5 or less at 25° C. of the total mass of the water-based inkjet yellow ink, and an amount of an organic solvent having a boiling point of 240° C. or higher under 1 atmosphere is 5% by mass or less of the total mass of the water-based inkjet yellow ink.

5 Claims, No Drawings

WATER-BASED INKJET YELLOW INK, INK SET, AND METHOD FOR PRODUCING PRINTED MATTER

CROSS REFERENCE TO RELATED APPLICATIONS

This application is a National Stage of International Application No. PCT/JP2019/049201 filed Dec. 16, 2019, claiming priority based on Patent Application No. 2018-235199 filed Dec. 17, 2018, the entire disclosure of which is incorporated herein by reference.

TECHNICAL FIELD

Embodiments of the present invention relate to a water-based inkjet yellow ink, an ink set containing the yellow ink, and a method for producing a printed matter.

BACKGROUND ART

Inkjet printing systems are systems in which minute droplets of inks are ejected and landed from inkjet heads onto a recording medium to form images and/or text on the recording medium, and do not require a printing plate. Compared with electrophotographic systems, which are other printing systems that do not require a printing plate, the inkjet printing systems are superior in terms to the price of the apparatus itself, running cost during printing, apparatus size, high-speed printing characteristics, and the like. With the spread of digital printing and the expansion of applications, the inkjet printing system is expected to grow in the future.

The inks used in the inkjet printing system include a wide variety of types such as an oil type, a solvent type, an active energy ray-curable type, and an aqueous type. In recent years, the active energy ray-curable type inkjet printing system is becoming widespread because of the advantages that the systems are applicable not only to a paper substrate, but also to a non-absorption substrate such as plastic or glass, the system has excellent durability of the printed matter, and the system can realize high-speed printing. However, in recent years, restrictions on the use of solvents and monomers have been promoted from the viewpoint of consideration and countermeasures for harm to the environment and humans, and replacement with a water-based ink has been desired, and demand for a water-based ink is increasing.

Further, in recent years, in accordance with the remarkable improvement in the performance of inkjet heads, it is expected that the inkjet printing system will be developed in the existing printing market which adopts printing systems using a plate such as an offset printing system. In the existing printing market, the productivity and color reproducibility of a recorded matter (printed matter) are very important. In particular, many special color inks are used in the conventional offset printing system, and a printed matter with an excellent color reproduction region is produced, and therefore, in order to achieve practical use of the inkjet printing system in the existing printing market, it is important to realize excellent color reproducibility. Further, it is required that the printed matter obtained is not discolored or faded during storage, and also that the inkjet ink stored for a long period of time is required to have the same color reproducibility as in the initial stage.

Conventionally, in inkjet printing using water-based inks, aqueous dyes have been used as the colorant. However, the water-based inks using aqueous dyes have a disadvantage that characteristics such as weather resistance and water resistance deteriorate. Therefore, in recent years, inks using pigments have been studied in place of the aqueous dyes. In fact, inkjet printers equipped with water-based inks that use pigments are being put into practical use, including large-sized printers in the advertising sign market.

CITATION LIST

Patent Literature

PLT 1: JP 2009-24072 A
PLT 2: JP 2015-93950 A
PLT 3: JP 2008-291103 A

SUMMARY OF INVENTION

Technical Problem

On the other hand, the color reproduction region greatly changes depending on the degree of color reproduction potential of the colorants used, particularly the three colors of yellow, cyan, and magenta, which are process colors. As described in Patent Literature 1, it is possible to use special color inks in order to improve color reproducibility, but it can be said that this is not a preferable measure from the viewpoint of reducing the cost and size of inkjet printers. Therefore, the selection of the above three color pigments is very important.

For example, in Patent Literatures 2 and 3, C. I. Pigment Yellow 180 and 213 are used as the yellow pigment. However, the yellow ink using these pigments has a weak coloring power, and it is difficult to obtain a printed matter with excellent color reproducibility. As described in Patent Literature 3, although it is possible to improve the color reproducibility to some extent by increasing the pigment concentration in the yellow ink, the increase in the pigment concentration adversely affects the storage stability and the dispersion stability. In addition, it is easily presumed that inkjet printing stability over a long period of time will deteriorate. In particular, in the single-pass printing system, which has rapidly become widespread in industrial applications in recent years, it is required that blockages of nozzles (a phenomenon in which ink is not discharged from a nozzle) and flight curving do not occur even in high-speed and long-time printing, and therefore, improvement of the color reproducibility by increasing the concentration of the pigment is not a preferable measure.

On the other hand, in order to achieve the expansion of applications for inkjet printing in the future, it is essential to expand the applications to the package market such as cardboard, paper container packages, and labels, in addition to the applications in the existing printing market such as commercial printing applications. In the package market, a printed matter with high image density and high light resistance is required, and in particular, a red color with high light resistance is often required as designs for sales promotion, corporate colors of companies, national colors of emerging countries, and the like. Generally, the red color is formed by overlayering a yellow color and a magenta color, and therefore, in order to meet the various demands described above and to improve the color reproducibility of the red region, it is essential to improve the color reproducibility and image density of the yellow ink as the base. Further, as described above, in order to realize stable discharge from the inkjet head nozzles, it is necessary to keep the pigment concentration in the ink to a certain amount or less, and a pigment which can improve the color reproducibility and the image density of the red region even under such a condition is required.

The present invention has been made to solve the above problems. An object of the present invention is to provide a water-based inkjet yellow ink with excellent color reproducibility and light resistance that can obtain a printed matter which does not cause discoloration and fading over time, and is also excellent in storage stability and dispersion stability. Another object of the present invention is to provide a water-based inkjet yellow ink that can obtain a printed matter also with excellent image density in addition to the above. Still another object of the present invention is to provide an ink set containing a water-based inkjet yellow ink and a water-based inkjet magenta ink that can obtain a printed matter with excellent balance of color reproducibility and light resistance in a red region, and a method for producing a printed matter using the ink set. Still further, another object of the present invention is to provide an ink set containing a water-based inkjet yellow ink, a water-based inkjet magenta ink, and a water-based inkjet cyan ink or a water-based inkjet violet ink that can obtain a printed matter with excellent color reproducibility in a red region and a green region, and a method for producing a printed matter using the ink set.

Solution to Problem

The present inventors have recently found that the above objects can be achieved by using the combination of a yellow pigment with a specific structure and a basic organic compound with a specific pKa value as an water-based inkjet yellow ink in a color inkjet printing system, and further by defining a boiling point of an organic solvent contained in the ink. Furthermore, it has been found that a printed matter in which high color rendering in a red region is particularly achieved can be obtained by using the water-based inkjet yellow ink described above in combination with a water-based inkjet magenta ink. Furthermore, it has been found that a printed matter in which high color rendering in a red region and a green region is particularly achieved can be obtained by using the water-based inkjet yellow ink described above in combination with a water-based inkjet magenta ink and a specific water-based inkjet cyan ink or a specific water-based inkjet violet ink.

That is, one embodiment of the present invention relates to a water-based inkjet yellow ink containing a yellow pigment (A) having a partial structure represented by general formula (1), an organic solvent, a basic organic compound, and water, wherein
an amount of the yellow pigment (A) is 1 to 10% by mass of a total mass of the water-based inkjet yellow ink;
the basic organic compound contains 0.1 to 1.25% by mass of a basic organic compound (B) having a pKa value of 9.5 or less at 25° C. of the total mass of the water-based inkjet yellow ink, and
an amount of an organic solvent having a boiling point of 240° C. or higher under 1 atmosphere is 5% by mass or less of the total mass of the water-based inkjet yellow ink, General formula (1):

[Chemical formula 1]

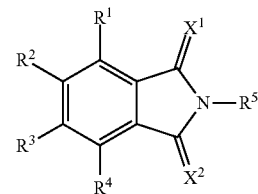

wherein, general formula (1) has at least one bonding site, and
in general formula (1),
$X^1$ and $X^2$ represent both =O or both =$CR^6R^7$, or $X^1$ is =O and $X^2$ is =$NR^8$,
each $R^1$ to $R^4$ independently represents a hydrogen atom or a halogen atom,
$R^5$ represents a hydrogen atom or a bonding site, and
each $R^6$ to $R^8$ represents a bonding site.

Further, one embodiment of the present invention relates to the water-based inkjet yellow ink described above, wherein an amount of the basic organic compound (B) having a pka value of 9.5 or less at 25° C. is 0.1 to 1% by mass of the total mass of the water-based inkjet yellow ink.

Further, one embodiment of the present invention relates to any one of the water-based inkjet yellow inks described above, wherein the yellow pigment (A) includes C. I. Pigment Yellow 139 and/or C. I. Pigment Yellow 185.

Further, one embodiment of the present invention relates to any one of the water-based inkjet yellow inks described above, wherein an amount of impurities contained in the yellow pigment (A) is 5% by mass or less of a total mass of the yellow pigment (A).

Furthermore, one embodiment of the present invention relates to an inkjet ink set containing:
any one of the water-based inkjet yellow inks described above, and
a water-based inkjet magenta ink containing a magenta pigment and water.

Further, one embodiment of the present invention relates to the inkjet ink set described above, wherein
the water-based inkjet magenta ink contains 1 to 10% by mass of a magenta pigment having a partial structure represented by general formula (2) shown below of a total mass of the water-based inkjet magenta ink,
General Formula (2):

[Chemical formula 2]

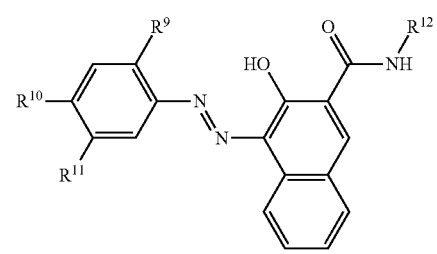

wherein, in general formula (2),
each $R^9$, $R^{10}$, and $R^{11}$ is independently any one of a hydrogen atom, an alkyl group having 1 to 2 carbon atoms, an alkoxy group having 1 to 2 carbon atoms, an anilide group, a carbamoyl group, a methoxycarbonyl group, an ethoxycarbonyl group, and a sulfonamide group, and $R^{12}$ is any one of a hydrogen atom, an alkyl group having 1 to 2 carbon atoms, and a structure represented by general formula (3) shown below, General Formula (3):

[Chemical formula 3]

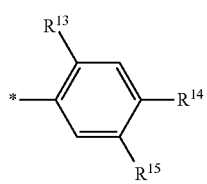

wherein, in general formula (3),
$R^{13}$ represents a hydrogen atom, a chlorine atom, a bromine atom, an alkyl group having 1 to 2 carbon atoms, an alkoxy group having 1 to 2 carbon atoms, an amino group, or a nitro group,
each $R^{14}$ and $R^{15}$ independently represents a hydrogen atom, a chlorine atom, a bromine atom, an alkyl group having 1 to 2 carbon atoms, an alkoxy group having 1 to 2 carbon atoms, an amino group, or a nitro group, or $R^{14}$ and $R^{15}$ are bonded to each other to form an imidazolidinone ring,
"*" represents a bonding site, and
the structure represented by general formula (3) is bonded to a nitrogen atom in the partial structure represented by general formula (2) at a position of "*".

Further, one embodiment of the present invention relates to any one of the inkjet ink sets described above, wherein
the magenta pigment having a partial structure represented by general formula (2) includes at least one selected from the group consisting of C. I. Pigment Red 146, C. I. Pigment Red 147, C. I. Pigment Red 150, C. I. Pigment Red 185, C. I. Pigment Red 266, and C. I. Pigment Red 269.

Further, one embodiment of the present invention relates to any one of the inkjet ink sets described above, further comprising a water-based inkjet cyan ink, wherein
the water-based inkjet cyan ink includes at least one selected from the group consisting of C. I. Pigment Blue 15:3 and C. I. Pigment Blue 15:6.

Further, one embodiment of the present invention relates to any one of the inkjet ink sets described above, further containing a water-based inkjet violet ink, wherein
the water-based inkjet violet ink includes at least one selected from the group consisting of C. I. Pigment Violet 3, C. I. Pigment Violet 23, C. I. Pigment Violet 27, and C. I. Pigment Violet 32.

Furthermore, one embodiment of the present invention relates to an inkjet ink set which contains any one of the water-based inkjet yellow inks described above, a water-based inkjet magenta ink, and a water-based inkjet cyan ink, and does not contain other water-based inkjet chromatic ink.

Furthermore, one embodiment of the present invention relates to an inkjet ink set which contains any one of the water-based inkjet yellow inks described above, a water-based inkjet magenta ink, and a water-based inkjet violet ink, and does not contain other water-based inkjet chromatic ink.

Furthermore, one embodiment of the present invention relates to an inkjet ink set which contains any one of the water-based inkjet yellow inks described above, a water-based inkjet magenta ink, a water-based inkjet cyan ink, and a water-based inkjet violet ink, and does not contain other water-based inkjet chromatic ink.

Furthermore, one embodiment of the present invention relates to a method for producing a printed matter including printing any one of the water-based inkjet yellow inks described above or any one of the inkjet ink sets described above on a recording medium using an inkjet printing system.

Advantageous Effects of Invention

One embodiment of the present invention is able to provide a water-based inkjet yellow ink with excellent color reproducibility and light resistance that can obtain a printed matter which does not cause discoloration and fading over time, and is also excellent in storage stability and dispersion stability. Another embodiment of the present invention is able to provide a water-based inkjet yellow ink that can obtain a printed matter also with excellent image density in addition to the above. Still another embodiment of the present invention is able to provide an ink set containing a water-based inkjet yellow ink and a water-based inkjet magenta ink that can obtain a printed matter with an excellent balance of color reproducibility and light resistance in a red region, and a method for producing a printed matter using the ink set. Still further, another embodiment of the present invention is able to provide an ink set containing a water-based inkjet yellow ink, a water-based inkjet magenta ink, and a water-based inkjet cyan ink or a water-based inkjet violet ink that can obtain a printed matter with excellent color reproducibility in a red region and a green region, and a method for producing a printed matter using the ink set.

DESCRIPTION OF EMBODIMENTS

Hereinafter, preferred embodiments of the present invention are described in detail. The embodiments described below explain examples of the present invention. Further, the present invention is not limited to the following embodiments, and also includes modifications that can be implemented without departing from the scope of the present invention. Unless otherwise specified, "parts" and "%" represent "parts by mass" and "% by mass". In the present description, the water-based inkjet yellow ink according to an embodiment of the present invention may be simply referred to as "the yellow ink".

<Water-Based Inkjet Yellow Ink>

The yellow ink according to an embodiment of the present invention contains 1 to 10% by mass of a yellow pigment (A) having a partial structure represented by general formula (1) of the total mass of the yellow ink, and 0.1 to 1.25% by mass of a basic organic compound (B) having a pKa value of 9.5 or less at 25° C. of the total mass of the yellow ink. Further, the amount of an organic solvent having a boiling point of 240° C. or higher under 1 atmosphere is 5% by mass or less (may be 0% by mass) of the total mass of the yellow ink.

When an ink is produced using a conventionally used yellow pigment, although it is possible to obtain a printed matter that satisfies either one of color reproducibility and light resistance, it is difficult to satisfy both of them. For example, if only C. I. Pigment Yellow 12 or C. I. Pigment Yellow 14 (insoluble monoazo-based pigment) known as a pigment with excellent coloring power is used, the printed matter is inferior in light resistance. If only C. I. Pigment Yellow 213 (quinoxaline-based pigment) is used, the printed matter has poor color reproducibility.

Even if a printed matter satisfying both of the above characteristics can be obtained, it is difficult to maintain the above characteristics for a long period of time. This is because it is generally difficult to stably disperse a yellow pigment in an aqueous medium, and it may be difficult to obtain an ink with excellent storage stability (viscosity stability) and dispersion stability. For example, C. I. Pigment Yellow 74 which is an insoluble monoazo-based pigment has good color reproducibility and light resistance, but the storage stability of the ink is poor due to the poor solvent resistance of the pigment, and as a result, if an ink after long-term storage is used, a printed matter with poor color reproducibility is obtained.

In the present description, the term "aqueous medium" means a medium composed of a liquid containing at least water.

Therefore, in an embodiment of the present invention, a certain amount of a yellow pigment having a specific partial structure is used together with a basic organic compound having a specific pKa value, and the boiling point of an organic solvent to be used together is specified to achieve both of the above characteristics.

Hereinafter, the components of the present invention are described in detail.

<Yellow Pigment (A)>

The yellow ink contains 1 to 10% by mass of a yellow pigment (A) having a partial structure represented by general formula (1) shown below of the total mass of the yellow ink.

General Formula (1):

[Chemical formula 4]

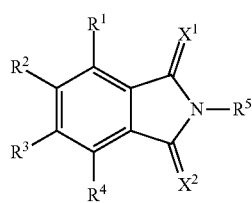

General formula (1) has at least one bonding site.

In general formula (1), $X^1$ and $X^2$ represent both =O or both =$CR^6R^7$, or $X^1$ is =O and $X^2$ is =$NR^8$.

Each $R^1$ to $R^4$ independently represents a hydrogen atom or a halogen atom, $R^5$ represents a hydrogen atom or a bonding site, and each $R^6$ to $R^8$ represents a bonding site.

The partial structure represented by general formula (1) includes phthalimide (In general formula (1), $X^1$ and $X^2$ are both =O. Examples include C. I. Pigment Yellow 138.), isoindolinone (In general formula (1), $X^1$ is =O and $X^2$ is =$NR^8$. Examples include C. I. Pigment Yellow 109 and 110.), isoindoline (In general formula (1), $X^1$ and $X^2$ are both =$CR^6R^7$. Examples include C. I. Pigment Yellow 139 and 185.), and the like. The yellow ink may contain only one type of the above pigments, or may contain two or more types in combination. If two or more types are used in combination, those in a mixed crystal state may be used.

Among the pigments exemplified above, from the viewpoint of having excellent light resistance and color reproducibility, one or more selected form C. I. Pigment Yellow 109 and 110 known as an isoindolinone-based yellow pigment, and C. I. Pigment Yellow 139 and 185 known as an isoindoline-based yellow pigment are preferably selected. In particular, from the viewpoint of having excellent coloring power and being capable of obtaining a printed matter with excellent image density even with a small amount of addition, it is particularly preferable to use one or more selected from C. I. Pigment Yellow 139 and 185, which are an isoindoline-based yellow pigment.

When using the yellow pigment (A), it is preferable to pay attention to the amount of impurities in the pigment. Since the presence of a large amount of impurities may cause foaming and/or inhibition of adsorption of the pigment and a pigment dispersing resin (described below) in a pigment dispersing step during ink production, it is sometimes difficult to achieve both excellent image density and color reproducibility of the printed matter and good storage stability and dispersion stability of the ink. From the above viewpoint, the amount of impurities present in the yellow pigment (A) is preferably 5% by mass or less, more preferably 4% by mass or less, and particularly preferably 3% by mass, of the total mass of the yellow pigment (A). The amount of impurities may be 0% by mass.

In the present description, the amount of impurities in the yellow pigment (A) can be measured by using the method described in examples below.

In particular, among the impurities, an alkali metal ion and an alkaline earth metal ion, such as a sodium ion and a calcium ion, are rapidly dissolved (ionized) in an aqueous medium and can move and diffuse arbitrarily, and accordingly, blockages of inkjet head nozzles may be caused at the time of discharge in addition to the inhibition of adsorption described above. Therefore, it is preferable to reduce the amount of a sodium ion and a calcium ion as much as possible. Specifically, the amount of a sodium ion and the amount of a calcium ion contained in the yellow pigment (A) are preferably 80 ppm or less (may be 0 ppm), more preferably 50 ppm or less (may be 0 ppm), and still more preferably 20 ppm or less (may be 0 ppm), respectively.

As a method for reducing impurities present in the yellow pigment (A), there is a method of washing the synthesized yellow pigment (A) with water and/or an organic solvent. In particular, it is preferable to perform one or more times of each of the washing process using water and the washing process using an organic solvent. A pure water or an ion exchanged water is preferably used as water.

The total amount of the yellow pigment (A) contained in the yellow ink is 1 to 10% by mass, and more preferably is 1.5 to 9.5% by mass of the total mass of the yellow ink. In consideration of storage stability and dispersion stability of the yellow ink as well as discharge stability from the inkjet heads, the total amount of the yellow pigment (A) is particularly preferably 2 to 8% by mass, and most preferably 3 to 5.5% by mass.

<Basic Organic Compound (B)>

The yellow ink contains a basic organic compound. The basic organic compound contains 0.1 to 1.25% by mass of a basic organic compound (B) having a pKa value of 9.5 or less at 25° C., and preferably 0.1 to 1.0% by mass, of the total mass of the yellow ink. The basic organic compound may include a basic organic compound having a pKa value of more than 9.5.

Generally, in a water-based ink, the dispersed state of the pigment is maintained due to the charge repulsion generated between the pigment particles, and storage stability and dispersion stability are ensured. In particular, in the case of inkjet applications, it is extremely important to maintain the dispersed state of the pigment for a long period of time in order to stably discharge the water-based ink without blockages of inkjet head nozzles for a long period of time.

As a method for achieving the long-term maintenance of the dispersed state, there is a method of adding a basic material to adjust the pH of the ink to 7 or more. By maintaining the pH on the basic side, the ion concentration in an electric double layer covering the pigment surface can be increased, the electric double layer repulsive force can be increased, and a large repulsive force can be generated between the pigment particles.

However, the yellow pigment (A) described above, especially the isoindoline-based pigment used particularly preferably in an embodiment of the present invention, is known to have weak durability to basic materials. Depending on the manner of combination, the yellow pigment (A) in the printed matter may decompose over time, and there is a possibility that discoloration and/or fading are caused.

As a result of the intensive study conducted by the present inventors to solve the problems described above, it has been found that by using the basic organic compound (B) having a pKa value of 9.5 or less as the basic material, excellent color reproducibility of the printed matter, prevention of fading and discoloration over time, and good storage stability and dispersion stability of the ink can be achieved at the same time. Although the detailed reasons are unclear, it is considered that characteristics that the acid dissociation constant (pKa value) is moderately small, and that the basic material is an organic compound suppress damage to the yellow pigment (A).

From the above viewpoint, the pKa value of the basic organic compound (B) is preferably 8.5 or less. By using a compound having a small pKa value, it is possible to suppress excessive pH fluctuation of the ink with respect to the amount added, and it is easy to prevent fading and discoloration of the printed matter over time, and to ensure storage stability and dispersion stability at the same time. The lower limit of the pKa value of the basic organic compound (B) is not particularly limited. For example, the pKa value is 3 or more, preferably 4.5 or more, and more preferably 6.5 or more, Specific examples of the basic organic compound (B) include diethanolamine (pKa=8.9), methyldiethanolamine (pKa=8.5), triethanolamine (pka=7.8), 1-amino-2-propanol (pKa=9.4), diisopropanolamine (pKa=9.0), triisopropanolamine (pKa=8.0), trishydroxymethylaminomethane (pKa=8.1), imidazole (pKa=7.0), and aniline (pKa=4.6). Among the above, from the viewpoint of high solubility in an aqueous medium and safety for the human body, the basic organic compound (B) preferably contains an aminoalcohol (alkanolamine), and particularly preferably contains triethanolamine which has a small pKa value. Only one of the above compounds may be used, or alternatively two or more of them may be used in combination. Examples of the case where two or more types are used in combination include a basic organic compound (B) containing a basic organic compound having a pKa value of 8.5 or less and a basic organic compound having a pKa value of more than 8.5; and a basic organic compound (B) containing triethanolamine and a basic organic compound other than triethanolamine, and the like.

In the present description, pKa can be measured using a known method, for example, a potentiometric titration method using water as the solvent in a 25° C. environment by using an automatic potentiometric titrator AT-710S manufactured by Kyoto Electronics Manufacturing Co., Ltd.

In some embodiments, the molecular weight of the basic organic compound (B) contained in the yellow ink is preferably 500 or less, more preferably 300 or less, and particularly preferably 200 or less. Further, the molecular weight is preferably 50 or more, more preferably 75 or more, and particularly preferably 100 or more. By using the basic organic compound (B) having the molecular weight described above, overdrying and remaining of the basic organic compound (B) at the time of printing can be prevented, and an ink with excellent color reproducibility and drying properties of the printed matter can be obtained. Further, although details are unclear, the basic organic compound (B) having the above molecular weight causes little damage to the yellow pigment (A), and can improve the storage stability and dispersion stability of the ink.

The amount of the basic organic compound (B) in the yellow ink is 0.1 to 1.25% by mass of the total mass of the yellow ink. If the amount is 0.1% by mass or more, it is easy to ensure storage stability for a long period of time, and the dispersion state of the yellow pigment (A) is not destroyed even when water is volatilized on inkjet head nozzles, and accordingly the deterioration in the quality of the printed matter due to the occurrence of blockages of nozzles or the like can be prevented. By adding 1.25% by mass or less, it is possible to prevent fading and discoloration of the printed matter over time. Further, depending on the material used as the basic organic compound (B), a compound having a high boiling point may be included, and thus, by ensuring the amount of 1.25% by mass or less, the drying properties of the ink does not deteriorate and the production speed of the printed matter does not need to be lowered. From the viewpoint of more preferably exhibiting the above effects, in some embodiments, the amount of the basic organic compound (B) is preferably 0.1 to 1.0% by mass of the total mass of the yellow ink.

Any optional component such as a pH adjuster and/or a surfactant described below is also included in the basic organic compound (B), if they correspond to the basic organic compound satisfying the pKa described above. Further, if the yellow ink contains a "pigment dispersing resin and/or binder resin" having an acid group as an optional component, and a "pigment dispersing resin and/or binder resin" having an acid group neutralized with a basic organic compound satisfying the pKa described above is used as the "pigment dispersing resin and/or binder resin" having an acid group, the basic organic compound (hereinafter referred to as a "basic organic compound (b2)") satisfying the pKa described above used for neutralization is also included in the basic organic compound (B).

However, it is generally considered that the basic organic compound (b2) forms intermolecular interaction with the "pigment dispersing resin and/or binder resin" having an acid group. Therefore, in some embodiments, the amount obtained by subtracting the amount of the basic organic compound (b2) from the total amount of the basic organic compound (B) contained in the yellow ink is preferably 0.1 to 1.0% by mass. Hereinafter, the basic organic compound (B) other than the basic organic compound (b2) may be referred to as a basic organic compound (b1).

The basic organic compound (b1) and the basic organic compound (b2) may be the same compound or compounds different from each other. If they are the same compound, the basic organic compound (b1) and the basic organic compound (b2) are preferably an amino alcohol (alkanolamine), and more preferably triethanolamine. If the compounds are different compounds, the combinations of the basic organic compound (b1) and the basic organic compound (b2) include, for example, a basic organic compound having a pKa value of 8.5 or less and a basic organic compound having a pKa of more than 8.5; and triethanolamine and a basic organic compound other than triethanolamine.

The basic organic compound may contain a basic organic compound having a pKa value of more than 9.5. If the basic organic compound contains the basic organic compound having a pKa value of more than 9.5, the amount of the basic organic compound having a pKa value of more than 9.5 is preferably more than 0% by mass but not more than 0.5% by mass, and more preferably more than 0% by mass but not more than 0.25% by mass, of the total mass of the yellow ink. The total amount of the basic organic compound (the total amount of the basic organic compound (B) and the basic organic compound having a pKa value of more than 9.5) is preferably 0.1 to 2.0% by mass, more preferably 0.1 to 1.5% by mass, and still more preferably 0.1 to 1.25% by mass, of the total mass of the yellow ink. Specific examples include a yellow ink in which the amount of the basic organic compound (B) is 0.1 to 1.0% by mass of the total mass of the yellow ink, and the total amount of the basic organic compounds (the total amount of the basic organic compound (B) and the basic organic compound having a pKa value of more than 9.5) is 1.5% by mass or less of the total mass of the yellow ink.

<Organic Solvent Having Boiling Point of 240° C. or Higher>

The amount of an organic solvent having a boiling point of 240° C. or higher at 1 atmosphere (hereinafter, also referred to as a "high boiling point organic solvent") is 5% by mass or less of the total mass of the yellow ink (may be 0% by mass).

In the ink in which the high boiling point organic solvent is excessively present, the high boiling point organic solvent tends to remain in the printed matter subjected to printing. In general, since the high boiling point organic solvent has high hygroscopicity, if the printed matter is stored for a long period of time, the high boiling point organic solvent may absorb moisture in the atmosphere. If the boiling point of the basic organic compound (B) to be used is high, it is considered that a part of the basic organic compound (B) also remains in the printed matter. In this case, it is also considered that the basic organic compound (B) is eluted into water absorbed by the high boiling point organic solvent and diffuses into the printed matter, thereby damaging the yellow pigment (A). As a result of the above, the printed matter produced by using an ink containing an excessive amount of the high boiling point organic solvent may cause fading and discoloration over time. Therefore, in an embodiment of the present invention, the phenomenon described above is suppressed by ensuring the amount of the high boiling point organic solvent in the yellow ink of a certain amount or less.

From the above viewpoint, the amount of the high boiling point organic solvent is preferably small, for example, more preferably 3% by mass or less, and particularly preferably 1.5% by mass or less, of the total mass of the yellow ink.

In the present description, the boiling point at 1 atmosphere can be measured by using a thermal analysis device such as DSC (Differential Scanning calorimetry).

<Water-soluble organic solvent>

The organic solvent is preferably a water-soluble organic solvent. Among the organic solvent, an organic solvent having a surface tension at 25° C. of 20 to 35 mN/m can be preferably used. This is because the static surface tension of the yellow ink can be reduced and the wettability and permeability to the recording medium are improved, so that a printed matter with excellent image density, color reproducibility, and other image quality can be obtained, and the drying properties of the ink can also be improved. The surface tension is described in "Chemical Handbook, Basic Edition, Revised 5th Edition" (Maruzen Publishing Co., Ltd., 2004) edited by the Chemical Society of Japan, and can be referred to. Further, the surface tension can be measured by the Wilhelmy method (plate method, vertical plate method) using a CBVP-Z surface tension meter manufactured by Kyowa Interface Science Co., Ltd.

The viscosity of the water-soluble organic solvent at 25° C. is preferably 1 to 20 mPa·s. The viscosity can be measured by, for example, TVE-25L (cone plate type E-type viscometer) manufactured by Toki Sangyo Co., Ltd.

Aliphatic polyols are preferably used as the solvent having the above characteristics. Among them, those having a boiling point at 1 atmosphere of 180° C. or more but 250° C. or less are preferably selected, and those having a boiling point of 180° C. or more but less than 240° C. are more preferably selected. This is because by using an aliphatic polyol that satisfies the above boiling point range, it is possible to easily control the wettability, permeability, and drying properties of the yellow ink without being affected by the type of the recording medium. In addition, this provides images with excellent image density, color reproducibility, and other image quality for various recording media without increasing the size of the drying device while maintaining the moisture retention on inkjet head nozzles.

The boiling point at 1 atmosphere can be measured by using, for example, a thermal analysis device. The surfactant described below is not included in the aliphatic polyols.

The aliphatic polyol having a boiling point of 180 to 250° C. is not limited to the following, but for example, 1,2-propanediol (propylene glycol, boiling point: 188° C.), 1,2-butanediol (boiling point: 194° C.), 1,2-ethandiol (ethylene glycol, boiling point: 197° C.), 2-methylpentane-2,4-diol (boiling point: 197° C.), 3-methyl-1,3-butanediol (boiling point: 203° C.), 1,3-butanediol (butylene glycol, boiling point: 207° C.), 1,2-pentanediol (boiling point: 210° C.), 1,3-propanediol (boiling point: 210° C.), 2,2-dimethyl-1,3-propanediol (boiling point: 210° C.), 2-methyl-1,3-propanediol (boiling point: 214° C.), 1-propen-1,3-diol (boiling point: 214° C.), 1,2-hexanediol (boiling point: 223° C.), 2-ethyl-2-methyl-1,3-propanediol (boiling point: 226° C.), 1,4-butanediol (boiling point: 230° C.), 2-methyl-2-propyl-1,3-propanediol (boiling point: 230° C.), dipropylene glycol (boiling point: 232° C.), 2-butene-1,4-diol (boiling point: 235° C.), 1,5-pentanediol (boiling point: 242° C.), 2-ethyl-1,3-hexanediol (boiling point: 244° C.), diethylene glycol (boiling point: 245° C.), 3-methyl-1,5-pentanediol (boiling point: 249° C.), and 1,6-hexanediol (boiling point: 250° C.).

Preferably, the yellow ink contains two or more types of the aliphatic polyols described above, and the total amount of the aliphatic polyols is in the range from 10 to 30% by mass of the total mass of the yellow ink. By using two or more types of aliphatic polyols within the amount range described above, the wettability, permeability, and drying properties of the recording medium can be easily controlled. As a result, a printed matter with excellent image density, color reproducibility, and other image quality can be obtained for both of a substrate having an absorbing layer and a low-absorption substrate.

In particular, at least one type of the two or more types of aliphatic polyols contained is preferably an alkanediol, and all of the aliphatic polyols contained in the yellow ink are more preferably an alkanediol. The reason is that the wettability of the yellow ink is improved on a highly hydrophobic low-penetration substrate such as a coated paper, an art paper, or a polyvinyl chloride sheet, which are generally cited as a recording medium used for a printed matter for industrial applications, and a printed matter with excellent image density, color reproducibility, and other image quality can be obtained with respect to the substrates described above.

Among the aliphatic polyols exemplified above, at least one selected from the group consisting of 1,2-propanediol, 1,2-butanediol, 1,2-ethanediol, 1,3-butanediol, 1,2-pentanediol, 1,5-pentanediol, 1,2-hexanediol, and 1,6-hexanediol is preferably used from the viewpoint of moisture retention and drying properties. Although the reason is unclear, these solvents are preferably selected from the viewpoint that they do not adversely affect the dispersion state of the yellow pigment (A), and as a result, the storage stability of the yellow ink can be improved.

The yellow ink containing two or more selected from the group consisting of 1,2-propanediol, 1,2-butanediol, 1,2-pentanediol, and 1,2-hexanediol as the water-soluble organic solvent, in which the total amount of the two or more water-soluble organic solvents is 10 to 30% by mass of the total mass of the yellow ink is most preferable. A yellow ink satisfying the above conditions can obtain a printed matter which has excellent image density, color reproducibility, and other image quality regardless of the recording medium used, and also has excellent storage stability.

Other organic solvents may also be used in combination to adjust the moisture retention and penetration of the yellow ink to the recording medium. Examples of other organic solvent include glycol monoalkyl ethers such as ethylene glycol monoethyl ether, ethylene glycol monobutyl ether, diethylene glycol monomethyl ether, diethylene glycol monoethyl ether, diethylene glycol monopropyl ether, diethylene glycol monobutyl ether, diethylene glycol monopentyl ether, diethylene glycol monohexyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monobutyl ether, propylene glycol monopropyl ether, propylene glycol monobutyl ether, dipropylene glycol monomethyl ether, and tripropylene glycol monomethyl ether; glycol dialkyl ethers such as diethylene glycol dimethyl ether, triethylene glycol dimethyl ether, tetraethylene glycol dimethyl ether, diethylene glycol diethyl ether, triethylene glycol diethyl ether, tetraethylene glycol diethyl ether, diethylene glycol methylethyl ether, triethylene glycol methylethyl ether, tetraethylene glycol methylethyl ether, diethylene glycol butylmethyl ether, triethylene glycol butylmethyl ether, and tetraethylene glycol butylmethyl ether; and, heterocyclic compounds such as 2-pyrrolidone, N-methylpyrrolidone, N-ethylpyrrolidone, N-methyloxazolidinone, N-ethyloxazolidinone, γ-butyrolactone, and ε-caprolactone. These solvents may be used alone, or a plurality of types may be used in combination.

<Pigment Other than Yellow Pigment (A)>

In order to obtain a printed matter with suitable image density and color reproducibility, for the yellow ink, a pigment other than the yellow pigment (A) may be used in combination. In this case, the amount of the yellow pigment (A) with respect to the total mass of the pigment used is preferably 50% by mass or more. The amount of the yellow pigment (A) is more preferably 70% by mass or more, still more preferably 90% by mass or more, and particularly preferably 95% by mass or more. The amount of the yellow pigment (A) with respect to the total mass of the pigment used may be 100% by mass.

Examples of the pigment other than the yellow pigment (A) that can be used in an embodiment of the present invention include C. I. Pigment Yellow 1, 2, 3, 10, 11, 12, 13, 14, 17, 20, 24, 74, 83, 86, 93, 94, 95, 117, 120, 125, 128, 137, 147, 148, 150, 151, 154, 155, 166, 168, 180 and 213. In particular, it is preferable to include one or more selected from the group consisting of C. I. Pigment Yellow 12, 13, 14, 74, 83, 120, 150, 151, 154, 155, 180 and 213.

Only one type of the above pigments may be used, or two or more types may be used in combination. If two or more types are used in combination, those in a mixed crystal state may be used. Further, if two or more types of pigments are not in a mixed crystal state, that is, two or more types of pigments each having a different crystal structure are used, the two or more types of pigments may be mixed and dispersed from the beginning by using the method described below or the like, or separately dispersed pigment dispersions may be mixed later.

From the viewpoint of color reproducibility of the printed matter, and storage stability and dispersion stability of the ink, the total amount of the pigment contained in the yellow ink is preferably 1 to 10% by mass, and more preferably 1.5 to 9.5% by mass of the total mass of the yellow ink.

<Pigment Dispersing Resin>

In an embodiment of the present invention, examples of a method of stably dispersing and preserving a pigment in the inkjet ink include a method of dispersing a pigment by making a water-soluble resin adsorbed on the surface of the pigment; a method of dispersing a pigment by making a water-soluble and/or water-dispersible surfactant adsorbed on the surface of the pigment; a method of dispersing a pigment in an ink by chemically and/or physically introducing a hydrophilic functional group on the surface of the pigment without any dispersant and surfactant; and a method of coating a pigment with a water-insoluble resin to form microcapsules.

Among the above dispersing methods, a method of dispersing with a resin (also referred to as a "pigment dispersing resin" in the present description) is preferable, and a method of dispersing with a water-soluble resin is more preferable. This is because by selecting and examining the composition and/or the molecular weight of monomers which form the resin, adsorbing ability of the resin to the pigment can be easily increased, and the dispersion stability can be imparted to the fine pigment, and accordingly a yellow ink with excellent color development and color reproducibility can be obtained.

The type of the pigment dispersing resin is not particularly limited, and examples thereof include a (meth)acrylic resin, a styrene (meth)acrylic resin, a maleic acid resin, a styrene maleic acid resin, an urethane resin, an ester resin, an amide resin, and an imide resin. Among them, at least one type selected from the group consisting of a (meth)acrylic resin, a styrene (meth)acrylic resin, an urethane resin, and an ester resin is preferable in terms of storage stability and dispersion stability of the yellow ink. The structure of the resin is also not particularly limited, and examples thereof include a random structure, a block structure, a comb-shaped structure, or a star-shaped structure. In the present description, the term "(meth)acrylic" means acrylic or methacrylic.

For the yellow ink, it is preferable to introduce an aromatic ring structure into the pigment dispersing resin because it is possible to improve the pigment dispersibility, the color reproducibility of the printed matter, and the storage stability and dispersion stability of the ink. Examples of a functional group having an aromatic ring structure include a phenyl group, a naphthyl group, an anthryl group, a tolyl group, a xylyl group, a mesityl group, an anisyl group and the like, and a phenyl group, a naphthyl group or a tolyl group is preferable. The reason is that the aromatic ring structure contained in the yellow pigment (A)

and the aromatic ring structure contained in the pigment dispersing resin interact with each other to remarkably improve the adsorbing ability of the pigment dispersing resin to the yellow pigment (A), and even if the pigment is finely dispersed, the color reproducibility of the printed matter and the storage stability and dispersion stability of the ink can be ensured over a long period of time.

If the amount ratio of the aromatic ring structure in the pigment dispersing resin is expressed by the compounding ratio of the monomer having the aromatic ring structure with respect to the total mass of the monomers used in resin synthesis, the compounding ratio is preferably 10% by mass or more but 70% by mass or less, and particularly preferably 15% by mass or more but 50% by mass or less. If the compounding ratio is 10% by mass or more, the adsorbing ability to the yellow pigment (A) can be improved, and as a result, it is possible to obtain a yellow ink with excellent color reproducibility, storage stability and dispersion stability of the printed matter. If the compounding ratio is 70% by mass or less, the viscosity of the pigment dispersion and the ink can be maintained within a range suitable for inkjet applications.

Furthermore, it is preferable to use a pigment dispersing resin having an alkyl group having 10 to 36 carbon atoms from the viewpoint of storage stability and dispersion stability. Examples of a method of synthesizing a pigment dispersing resin having an alkyl group include a method of condensing an alcohol and/or an amine having an alkyl group with a functional group such as a carboxylic acid within the resin skeleton of the base structure, a method of using a monomer having an alkyl group at the time of synthesis, or the like.

The alkyl group particularly preferably has 10 to 36 carbon atoms, and although both linear and branched can be used, a linear alkyl group is more preferable. Examples of the linear alkyl group include a lauryl group (C12), a myristyl group (C14), a cetyl group (C16), a stearyl group (C18), an arachyl group (C20), a behenyl group (C22), a lignoceryl group (C24), cerotoyl group (C26), montanyl group (C28), melissyl group (C30), dotriacontanyl group (C32), tetratriacontanyl group (C34), and hexatriacontanyl group (C36). By ensuring the number of carbon atoms of the alkyl group of the pigment dispersing resin of 10 to 36, the storage stability and dispersion stability of the pigment dispersion and the ink can be improved and also the viscosity of the pigment dispersion and the ink can be reduced. The number of carbon atoms of the alkyl group is preferably 12 to 30, and still more preferably 18 to 24.

The acid value of the pigment dispersing resin is preferably 50 to 400 mgKOH/g. By ensuring the acid value of 50 mgKOH/g or more, the solubility of the pigment dispersing resin is optimized, and accordingly the storage stability and dispersion stability can be improved and also the viscosity of the ink can be reduced. By ensuring the acid value of 400 mgKOH/g or less, the interaction between the resin molecules can be appropriately suppressed, and the viscosity of the ink can be reduced. The acid value of the pigment dispersing resin is preferably 100 to 350 mgKOH/g, and still more preferably 150 to 300 mgKOH/g.

The acid value of the resin in the present description is a value of mg of potassium hydroxide (KOH) required for neutralizing an acid contained in 1 g of the resin, and is a value titrated using a KOH solution in an ethanol/toluene mixed solvent. The acid value can be measured, for example, by using the "automatic potentiometric titrator AT-610" manufactured by Kyoto Electronics Manufacturing Co., Ltd.

The weight average molecular weight of the pigment dispersing resin is preferably in the range from 1,000 to 100,000, and more preferably in the range from 5,000 to 50,000. If the molecular weight is in the range described above, the yellow pigment (A) is stably dispersed in water, and the viscosity is easily adjusted when applied to the yellow ink. If the weight average molecular weight is 1,000 or more, the pigment dispersing resin is less likely to dissolve in the organic solvent, and accordingly the resin adsorbed on the yellow pigment (A) is less likely to be desorbed, and as a result, the storage stability and dispersion stability are remarkably improved. In addition, by ensuring the weight average molecular weight of 100,000 or less, it is also possible to improve the discharge stability from inkjet heads.

The weight average molecular weight in the present description can be measured by using a conventional method. Specifically, it is obtained as a polystyrene-equivalent value measured using a TSK gel column (manufactured by Tosoh Corporation) and a GPC measuring apparatus (HLC-8120 GPC manufactured by Tosoh Corporation) equipped with an RI detector, and using THF as the eluent.

If the pigment dispersing resin has an acid group, it is preferable that the acid group in the pigment dispersing resin is neutralized with a base in order to increase the solubility of the pigment dispersing resin in water. As the base, an organic compound such as dimethylaminoethanol, diethanolamine and triethanolamine, and an inorganic compound such as ammonia, lithium hydroxide, sodium hydroxide and potassium hydroxide can be used. Neutralization may be partial neutralization or complete neutralization. If an organic compound is used as a base, the organic compound may be an organic compound corresponding to the basic organic compound (B) (that is, the basic organic compound (b2)) or an organic compound not corresponding to the basic organic compound (B) (that is, a basic organic compound having a pKa value of more than 9.5). The basic organic compound (b2) is preferably, for example, a basic organic compound having a pka of 8.5 or less. The basic organic compound (b2) is preferably, for example, a basic organic compound having a pKa of more than 8.5. Alternatively, from the viewpoint of being suitable for neutralization, the organic compound for neutralization is preferably a compound not corresponding to the basic organic compound (B) (that is, a basic organic compound having a pKa value of more than 9.5).

The amount of the pigment dispersing resin is preferably 1 to 50% by mass relative to the total mass of the pigment. By ensuring the ratio of the pigment dispersing resin within the range described above, the viscosity of the pigment dispersion and the yellow ink can be maintained to be low, and the color reproducibility of the printed matter, as well as the storage stability and dispersion stability are improved. The amount ratio of the pigment dispersing resin is preferably 2 to 45% by mass, more preferably 4 to 40% by mass, and still more preferably 5 to 35% by mass, relative to the total mass of the pigment.

<Pigment Derivative>

In an embodiment of the present invention, a pigment derivative can be used for the purpose of improving the adsorbability of the pigment dispersing resin to the yellow pigment (A) and the pigment other than the yellow pigment (A), improving the storage stability and dispersion stability of the pigment, achieving fine dispersion, and improving the color reproducibility of the printed matter. As the pigment derivative, a compound having an organic coloring material as the basic skeleton and having a substituent introduced into the molecule is preferable, and examples thereof include compounds represented by general formulas (4) to (6) shown below.

General Formula (4):

$$P\text{-}(Z_1)_{n_1}$$ [Chemical formula 5]

In general formula (4), P is an $n_1$-valent organic coloring material residue, $n_1$ is an integer of 1 or more, and $Z_1$ represents a sulfonic acid group or a carboxyl group. $n_1$ is preferably 1 to 5, more preferably 1 to 3, still more preferably 1 to 2, and most preferably 1. $Z_1$ is preferably a sulfonic acid group.

General Formula (5):

$$P\text{-}(Z_2)_{n_2}(Z_3)_{n_2}$$ [Chemical formula 6]

In general formula (5), P is an $n_2$-valent organic coloring material residue, $n_2$ is an integer of 1 or more, $Z_2$ represents $SO_3^-$ or $COO^-$, and $Z_3$ represents an alkali metal cation, $NH_4^+$, a primary ammonium cation, a secondary ammonium cation, a tertiary ammonium cation, or a quaternary ammonium cation. $n_2$s are preferably 1 to 5, more preferably 1 to 3, still more preferably 1 to 2, and most preferably 1.

General Formula (6):

$$P\text{-}(R^{16})_{n_3}$$ [Chemical formula 7]

In general formula (6), P is an $n_3$-valent organic coloring material residue, $n_3$ is an integer of 1 or more, and $R^{36}$ represents an organic group represented by general formula (7) shown below. $n_3$ is preferably 1 to 5, more preferably 1 to 3, still more preferably 1 to 2, and most preferably 1.

General formula (7):

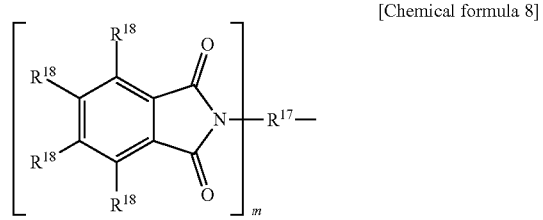

[Chemical formula 8]

In general formula (7), $R^{17}$ represents an (m+1)-valent organic residue, m represents an integer of 1 or more, and $R^{18}$s represent a hydrogen atom, a halogen atom, or an alkyl group having 1 to 10 carbon atoms. $R^{18}$s are preferably an alkylene group having 1 to 10 carbon atoms, and more preferably an alkylene group having 1 to 5 carbon atoms. It is preferable that $R^{18}$s are all hydrogen atoms.

Examples of the organic coloring material residue (P) include an azo-based residue, a benzimidazolone-based residue, a phthalocyanine-based residue, a quinacridone-based residue, an anthraquinone-based residue, a dioxazine-based residue, a diketopyrrolopyrrole-based residue, a quinophthalone-based residue, an isoindolinone-based residue, an isoindoline-based residue, a perylene-based residue, a perinone-based residue, a flavanthrone-based residue, a pyranthrone-based residue, or an anthrapyrimidine-based residue. Although the structure of the organic coloring material residue (P) does not necessarily need to be identical to the structure of the pigment, it is preferable to select one having a hue close to that of the ink. Further, it is preferable that the organic coloring material residue (P) has a structure similar to that of the pigment used for the ink. As a result, the adsorption with the pigment is enhanced, and the effect of improving the stability is easily exhibited.

Since the pigment derivative represented by general formula (6) described above has a structure similar to the partial structure of the yellow pigment (A) represented by general formula (1), the pigment derivative has a particularly high affinity with the yellow pigment (A) and is suitably selected. The yellow pigment (A) can be fined and the particle size distribution can be narrowed by using the yellow pigment (A) in combination with a pigment dispersing resin having an aromatic ring structure. As a result, the amount of coarse particles contained in the yellow ink is remarkably reduced, and accordingly the discharge stability from the inkjet heads can be improved, and the storage stability and the dispersion stability can also be improved. In addition, a printed matter with excellent color reproducibility or the like can be obtained. Further, since the amount of coarse particles present on the surface of the printed matter is remarkably reduced and the smoothness of the surface is increased, it is possible to suppress irregular reflection of light incident on the printed matter. As a result, high density of the printed matter can be achieved.

When the pigment derivative is used, the amount thereof is preferably 0.1 to 10% by mass, and particularly preferably 0.1 to 5% by mass, relative to the total mass of the pigment in the ink. If the amount is 0.1% by mass or more, the addition ratio to the pigment becomes sufficient, and the color reproducibility of the printed matter, and the storage stability and the dispersion stability are improved. If the amount is 10% by mass or less, the pigment is not fined unnecessarily, and accordingly the storage stability and dispersion stability can be improved and the deterioration in the light resistance of the printed matter can be prevented.

<Method for Producing Pigment Dispersion>

Examples of a method for producing the pigment dispersion include a following method, but are not limited thereto. First, a yellow pigment (A) and an optional component such as other pigment, a pigment derivative and an organic solvent are added to a solution containing a pigment dispersing resin, water, and an organic solvent as desired, mixed and stirred, and then are subjected to dispersion treatment using a dispersion device. Then, the pigment dispersion can be obtained by centrifugation and/or filtration as desired. Any known dispersion device can be used as the dispersion device, but a bead mill is preferably used.

In some embodiments, for the yellow ink, the pigment preferably has an average secondary particle size (D50) of from 40 nm to 500 nm, more preferably from 50 nm to 400 nm, and particularly preferably from 60 nm to 300 nm, from the viewpoint of being able to obtain a printed matter with excellent image density and color reproducibility. The average secondary particle size is, for example, a volume-based median size measured using a dynamic light scattering method. Specifically, the measurement can be performed using Nanotrac UPA-EX150 manufactured by Microtrac-BEL Corporation, and using an ink diluted with water as desired.

Methods of adjusting the average secondary particle size include reducing the size of the pulverizing medium in the dispersion device, changing the material of the pulverizing medium, increasing the filling rate of the pulverizing medium, changing the shape of the agitating member (agitator), increasing the dispersion processing time, classifying with a filter and/or a centrifuge after the dispersion treatment, and combinations of these methods. In order to adjust the average secondary particle size of the pigment within the suitable particle size range described above, the size of the pulverizing medium of the dispersion device is preferably 0.1 to 3 mm. Further, glass, zircon, zirconia and titania are preferably used as a material of the pulverizing medium.
<Binder Resin>

The yellow ink preferably contains a binder resin. Generally, resin microparticles and a water-soluble resin are known as a binder resin for the water-based inkjet ink, and in an embodiment of the present invention, either one of them may be selected and used, or both of them may be used in combination. Types of the resin used as the binder resin include a (meth)acrylic resin, a styrene (meth)acrylic resin, a maleic acid resin, a styrene maleic acid resin, a styrene butadiene resin, an urethane resin, an amide resin, an imide resin, and an olefin resin. Among them, a (meth)acrylic resin, a styrene (meth)acrylic resin, an urethane resin, and an olefin resin are preferable, when the storage stability and dispersion stability of the yellow ink and the durability of the printed matter are taken into consideration.

If the binder resin has an acid group, the acid group in the binder resin may be neutralized with a base. The description of the base used to neutralize the pigment dispersing resin can also be applied to the binder resin.

The resin microparticles are suitable for increasing the durability of the printed matter because the resin microparticles have a higher molecular weight than the water-soluble resin, or because the viscosity the ink can be lowered and a larger amount of the resin can be blended in the ink. On the other hand, in the ink containing the resin microparticles, the resin microparticles in a dispersed state aggregate and form a film when the water volatilizes, and accordingly blockages of inkjet head nozzles are caused. Further, if resin microparticles that are easily formed into a film are used, a printed matter is inferior in surface smoothness, and as a result, the image density and/or the color reproducibility may be lowered. As a method of suppressing the above phenomenon, for example, the monomer composition for obtaining the resin microparticles is controlled so that the glass transition point (Tg) is set to 80° C. or higher, the amount of the resin microparticles in the yellow ink is set to be 2% by mass or less, or both of them may be performed. From this point of view, when the resin microparticles are used, it is particularly preferable to select styrene (meth)acrylic resin microparticles and/or olefin resin microparticles.

The inventors of the present invention have studied intensively and found that, when olefin resin microparticles are used as the resin microparticles, the color reproducibility of the printed matter, and the storage stability and dispersion stability of the ink are improved, and the discoloration of the printed matter over time can be prevented depending on the conditions. Specifically, if the amine value of the yellow pigment (A) is Am (PA) [mgKOH/g], the amount of the yellow pigment (A) of the total mass of the ink is C (PA) [% by mass], the acid value of the olefin resin microparticles is Av (RO) [mgKOH/g], and the amount of the olefin resin microparticles of the total mass of the ink is C (RO) [% by mass], the acid value/amine value ratio represented by formula (8) shown below is preferably $0.5 \times 10^{-4}$ to $15 \times 10^{-4}$, and particularly preferably $1.5 \times 10^{-4}$ to $10 \times 10^{-4}$. Although the detailed reason is unclear, it is considered that the aggregation of the yellow pigment (A) can be prevented by the interaction between the acid group present in the olefin resin microparticles and the yellow pigment (A) having an amine structure and the presence of the olefin resin microparticles around the yellow pigment (A).

Acid value/amine value ratio=$\{Av(RO) \times C(RO)\} \div \{Am(PA) \times C(PA)\}$     Formula (8):

On the other hand, if the maintenance performance of the inkjet printer is taken into consideration, it is preferable to select a water-soluble resin as the binder resin. In this case, the weight average molecular weight of the water-soluble resin is preferably in the range from 5,000 to 50,000, and more preferably in the range from 10,000 to 40,000. By ensuring the weight average molecular weight of 5,000 or more, the coating film durability of the printed matter can be improved, and by ensuring the weight average molecular weight of 50,000 or less, the good discharge stability from the inkjet heads can be achieved, and the ink with excellent printing stability can be obtained. The weight average molecular weight of the binder resin can be measured in the same manner as in the case of the pigment dispersing resin.

When selecting a water-soluble resin as the binder resin, it is also preferable to consider the acid value, and the acid value is preferably 5 to 80 mgKOH/g, and more preferably 10 to 50 mgKOH/g. If the acid value is 10 mgKOH/g or more, the blockages of the inkjet head nozzles are less likely to occur, and printing stability is remarkably improved. Further, the acid value of 80 mgKOH/g or less is preferable because the water resistance of the printed matter is good. The acid value of the binder resin can also be measured in the same manner as in the case of the pigment dispersing resin.

The total amount of the binder resin in the yellow ink in terms of solid fraction is preferably in the range from 2 to 10% by mass, more preferably in the range from 3 to 8% by mass, and particularly preferably in the range from 3 to 6% by mass, of the total mass of the yellow ink. If the resin microparticles and the water-soluble resin are used in combination as the binder resin, the amount of the resin microparticles in the yellow ink is preferably 0.5 to 2% by mass.

<Surfactant>

It is more preferable to add a surfactant to the yellow ink for the purpose of adjusting the surface tension and ensuring the wettability on the recording medium. In an embodiment of the present invention, all of cationic, anionic, amphoteric and nonionic surfactant can be used. Further, only one type may be used alone, or two or more types may be used in combination.

Examples of the cationic surfactant include fatty acid amine salts, aliphatic quaternary ammonium salts, benzalkonium salts, benzethonium chloride, pyridinium salts, and imidazolinium salts.

Examples of anionic surfactants include fatty acid soaps, N-acyl-N-methylglycine salts, N-acyl-N-methyl-β-alanine salts, N-acylglutamate salts, acylated peptides, alkyl sulfonate salts, alkyl benzene sulfonate salts, alkyl naphthalene sulfonate salts, dialkyl sulfosuccinate salts, alkyl sulfoacetate salts, α-olefin sulfonate salts, N-acyl methyl taurine, sulfated oils, higher alcohol sulfate ester salts, secondary higher alcohol sulfate ester salts, alkyl ether sulfate salts, secondary higher alcohol ethoxy sulfates, fatty acid alkylolamide sulfate ester salts, alkyl ether phosphate ester salts, and alkyl phosphate ester salts.

Examples of the amphoteric surfactant include carboxybetaine types, sulfobetaine types, aminocarboxylic acid salts, and imidazolinium betaine.

Examples of the nonionic surfactant include polyoxyethylene secondary alcohol ethers, polyoxyethylene alkyl phenyl ethers, polyoxyethylene sterol ethers, polyoxyethylene lanolin derivatives, polyoxyethylene polypropylene alkyl ethers, polyoxyethylene glycerol fatty acid esters, polyoxyethylene castor oils, hydrogenated castor oils, polyoxyethylene sorbitol fatty acid esters, polyethylene glycol fatty acid esters, fatty acid monoglycerides, polyglycerol fatty acid esters, sorbitan fatty acid esters, propylene glycol fatty acid esters, sucrose fatty acid esters, fatty acid alka nolamides, polyoxyethylene fatty acid amides, polyoxyethylene alkylamines, alkylamines oxides, acetylenediol-based compounds, acetylene alcohol-based compounds, polyether-modified siloxane-based compounds, and fluorine-based compounds.

Among the surfactants exemplified above, a nonionic surfactant is preferably used in order to improve the wettability to the recording medium, and it is more preferable to select at least one selected from the group consisting of an acetylenediol-based compound, a polyether-modified siloxane-based compound, and a fluorine-based compound. In particular, from the viewpoint of controlling and lowering the surface tension of the ink, it is preferable to use an acetylenediol-based compound and/or a polyether-modified siloxane surfactant.

In particular, if the yellow ink is used in the form of the ink set described below, it is preferable to use both an acetylenediol-based compound and a polyether modified siloxane-based compound together to produce a printed matter with excellent color reproducibility and other image quality for various types of recording medium. In principle, it is inferred that the dynamic surface tension of the ink is significantly reduced by the acetylenediol-based compound to impart the wettability to various types of recording medium, and the polyether-modified siloxane-based compound can control mixing of ink droplets to improve color reproducibility and other image quality.

Among the surfactants described above, by using one having a low HLB (Hydrophile-Lipophile Balance) value, it is possible to remarkably reduce the dynamic surface tension of the water-based inkjet ink. As a result, the wettability of the ink can be improved not only for a penetrating recording medium such as a high-absorption substrate but also for a resin-coated recording medium, and therefore the image density, color reproducibility and other image quality of the printed matters using various types of recording medium can be significantly improved. The HLB value is preferably 8 or less (may be 0), and particularly preferably 6 or less (may be 0).

The HLB value is one of parameters indicating hydrophilicity or hydrophobicity of the material, and the smaller the value, the higher the hydrophobicity of the material, and the larger the value, the higher the hydrophilicity of the material. There are various methods for calculating the HLB value, such as the Griffin method, the Davis method, and the Kawakami method, and various methods for the actual measurement are also known. However, in the present description, for a compound with a clear structure such as the acetylenediol-based compound, the HLB value is calculated using the Griffin method. The Griffin method is a method in which an HLB value is obtained by formula (9) shown below using the molecular structure and molecular weight of the target material.

$$\text{HLB value} = 20 \times (\text{sum of the molecular weights of hydrophilic moieties}) \div (\text{molecular weight of material}) \quad \text{Formula (9)}$$

On the other hand, if a compound having an unknown structure such as the polyether-modified siloxane-based compound is contained, for example, the HLB value of the surfactant can be obtained experimentally by the method described on p. 324 in "Surfactant Handbook" (Industrial Book Company, 1960) edited by Ichiro NISHI et al. Specifically, after dissolving 0.5 g of a surfactant in 5 mL of ethanol, the obtained solution is titrated with a 2% by mass phenol aqueous solution while stirring at 25° C., and the end point is determined as where the solution becomes turbid. When the amount of the phenol aqueous solution required up to the end point is A (mL), the HLB value can be calculated by formula (10) shown below.

$$\text{HLB value} = 0.89 \times A + 1.11 \quad \text{Formula (10)}$$

The amount of the surfactant added to the yellow ink is preferably 0.1 to 5.0% by mass, more preferably 0.3 to 4.0% by mass, and still more preferably 0.5 to 3.0% by mass, of the total mass of the yellow ink. If the amount is 0.1% by mass or more, the effect of sufficiently reducing the dynamic surface tension of the yellow ink can be obtained, and the image quality of the printed matter can be improved. Further, by ensuring the amount of 5.0% by mass or less, it becomes possible to control the wetting of the yellow ink and the meniscus around the inkjet head nozzles, and then the stable discharge from the inkjet heads can be achieved, and accordingly the printing stability is improved.

<Water>

The amount of water is in the range from 45 to 95% by mass, still more preferably in the range from 50 to 75% by mass of the total mass of the yellow ink. As described above, by reducing impurities such as alkali (earth) metal ions contained in the yellow ink, both excellent image density and color reproducibility of the printed matter, and the improved storage stability and dispersion stability of the ink can be achieved. From this point of view, a pure water or an ion-exchanged water is preferably used as water contained in the yellow ink, instead of using general water containing various ions.

<Other Components>

In addition to the components described above, additives such as antifoaming agents, thickeners, preservatives, infrared absorbers, and ultraviolet absorbers can be suitably added to the yellow ink in order to obtain an ink having desired physical properties as desired. As an example of the addition amount of these additives, 0.01 to 10% by mass or less is preferable of the total mass of the yellow ink.

The yellow ink preferably contains substantially no polymerizable monomer. The term "contains substantially no" means that the polymerizable monomer is not intentionally added to the yellow ink, and does not exclude a small amount of contamination or generation during the production and storage of the inkjet ink. Specifically, the amount of the polymerizable monomer is preferably 1% by mass, and particularly preferably 0.5% by mass or less of the total mass of the yellow ink.

<Method for Producing Yellow Ink>

The method for producing a yellow ink is not particularly limited. From the viewpoint of obtaining an excellent printed matter and good storage stability and dispersion stability, for example, the method for producing a yellow ink preferably includes mixing a yellow pigment dispersion containing a yellow pigment (A), a basic organic compound (B), an organic solvent, and water. If the yellow ink contains an optional component, for example, the method for producing a yellow ink preferably includes mixing a yellow pigment dispersion containing a yellow pigment (A), a basic organic compound (B), an organic solvent, water, and an optional component. Examples of the optional component include, for example, a binder resin or a binder resin dispersion containing a binder resin, a surfactant, and the like. The amount of the basic organic compound (B) added at the time of mixing is preferably an amount to be 0.1 to 1.0% by mass of the total mass of the yellow ink. The basic organic compound (B) added at the time of mixing is preferably an alkanolamine, and more preferably triethanolamine. For example, the method for producing a yellow ink preferably includes adding to a container a yellow pigment dispersion containing a yellow pigment (A), a basic organic compound (B) in an amount to be 0.1 to 1.0% by mass of the total mass of the yellow ink, an organic solvent, water, and an optional component as desired, and mixing these components. The yellow pigment dispersion may or may not contain the basic organic compound (B).

The pigment dispersion contains a pigment dispersing resin, water, and a yellow pigment (A), and may further contain an optional component. Examples of the optional component include other pigment, a pigment derivative, an organic solvent, a base for neutralization when the pigment dispersing resin has an acid group, and the like. The binder resin dispersion contains a binder resin and water, and may further contain an optional component. Examples of the optional component include an organic solvent, a base for neutralization when the binder resin has an acid group, and the like. The binder resin dispersion may or may not contain the basic organic compound (B).

<Characteristics of Yellow Ink Coated Matter>

As described above, a printed matter with excellent color reproducibility can be obtained by using the yellow ink. Further, by using the yellow ink in combination with the water-based inkjet magenta ink described below, a printed matter having particularly excellent color reproducibility in the red region can be obtained. In particular in an embodiment of the present invention, it is preferable to use a yellow ink in which a hue angle $\angle H°$ measured using the following method is in the range from 70 to 105° from the viewpoint of the color reproducibility, more preferably in the range from 76 to 102°, and particularly preferably in the range from 82 to 98°. As standards or criteria relating to colors, for example, Japan Color (Japan offset sheet-fed printing color standard), Fogra (German printing related standard), SWOP (US off-wheel printing standard), and other standards conforming to the international offset printing standards (ISO 12647-2) are known. A yellow ink satisfying the hue angle described above can satisfy each of the printing color standards or criteria described above, and a printed matter with excellent color reproducibility can be obtained.

The hue angle $\angle H°$ of the yellow ink is measured by using a coated matter prepared by applying the yellow ink to a recording medium to form a wet film having a thickness of 6 μm and drying the wet film. Specifically, the yellow ink is applied using K control coater K202 manufactured by Matsuo Sangyo Co., Ltd., and the wire bar No. 1, and is then dried in an oven at 80° C. for 1 minute or more to obtain a coated matter. Then, the measurement is performed using i1Pro2 manufactured by X-rite Inc. under the conditions of a light source D50, a view angle 2° and a CIE color system, and using the obtained a* and b* values, $\angle H°$ is obtained in accordance with/H°=tan-1 (b*/a*)+180 (for a*<0) or $\angle H°=\tan^{-1}(b*/a*)+360$ (for a*>0). For applying, for example, UPM Finesse Gloss paper manufactured by UPM Corporation is used as a recording medium.

Further, from the viewpoint of obtaining a yellow ink having excellent image density and further excellent color reproducibility in the red region when combined with a water-based inkjet magenta ink, the spectral reflectance of the coated matter having a wet film thickness of 6 μm produced using the method described above is preferably 10% or less in the wavelength region of 380 to 480 nm. The spectral reflectance of the printed matter is calculated using the method specified in ISO 5-3:2009, and a StatusT Blue filter is used for measuring the yellow color. Specifically, the hue angle $\angle H°$ can be measured using i1Pro2 manufactured by X-rite Inc. in the same manner as the hue angle $\angle H°$ described above.

As described above, the yellow ink contains a yellow pigment (A), and a pigment other than the yellow pigment (A) as desired. From the viewpoint of obtaining a yellow ink coated matter having the characteristics described above, that is, obtaining a printed matter with excellent color reproducibility and image density, it is preferable to select a pigment having a hue angle $\angle H°$ in the range from 82° to 98° as both of the yellow pigment (A) and the pigment other than the yellow pigment (A). Among them, it is particularly preferable to select a pigment that satisfies the hue angle described above and has a spectral reflectance of 10% or less in the wavelength region of 380 to 480 nm. Since the color characteristics of the pigment also change depending on the dispersion state, it is preferable to perform the measurement using, for example, a pigment dispersion produced by the same method as the yellow pigment dispersion 1 of examples described below. Further, as a specific method for measuring the hue angle, the pigment dispersion is diluted with water so that the pigment concentration becomes 3% by mass, and then the pigment dispersion is applied onto a recording medium in the same manner as the yellow ink coated matter having the wet film thickness of 6 μm. Then, the hue angle and the spectral reflectance of the obtained coated matter are measured using the method described above.

Among the yellow pigment (A) exemplified above, those satisfying the hue angle and the spectral reflectance are C. I. Pigment Yellow 139 and C. I. Pigment Yellow 185.

Further, in an embodiment of the present invention, from the viewpoint of obtaining a printed matter with excellent light resistance, it is preferable to select a pigment having a blue-wool scale of grade 4 or higher using the third exposure method of the "Test methods for color fastness to xenon arc lamp light" specified in JIS L 0843 as the pigment contained in the yellow ink.

<Ink Set>

As described above, by using the yellow ink according to an embodiment of the present invention, it is possible to obtain a printed matter with excellent color reproducibility and light resistance which does not cause discoloration or fading over time. Further, by using an ink set obtained by combining the yellow ink with the water-based inkjet magenta ink described below (hereinafter, also simply referred to as the "magenta ink"), it is possible to obtain a printed matter having particularly excellent color reproducibility and light resistance in the red region and having a wide color gamut.

In some embodiments, an ink set including a combination of the yellow ink according to an embodiment of the present invention, the magenta ink described below, the water-based inkjet cyan ink described below (hereinafter, simply referred to as the "cyan ink") or the water-based inkjet violet ink described below (hereinafter, simply referred to as the "violet ink") is used to obtain a printed matter having excellent color reproducibility, particularly in the red region and green region, regardless of the type of recording medium without using other water-based inkjet chromatic inks.

In the present description, the term "chromatic color" generally refers to all colors other than colors having no chroma (black, light black (gray), and white).

In general, in inkjet printing using a water-based ink, a printed matter having a secondary color is produced by causing two or more types of inks of different colors to be contacted on a recording medium. For example, when a low-absorption substrate is used as the recording medium, if inkjet printing is performed at a high speed, or if a print ratio of the printed matter is high, the inks come into contact with each other in a wet state. In such a case, a printed matter with poor color reproducibility may be obtained depending on the inks used. Conventionally, in order to obtain a printed matter having excellent color reproducibility of a secondary color, methods have been employed such as using ink having the secondary color (for example, a red ink, a green ink, and the like, see also Patent Literature 1), applying a treatment liquid to a recording medium, and drying a recording medium every time one color is printed. However, these methods inevitably increase the size and the cost of the printing apparatus.

To cope with the above situation, even if an ink set containing chromatic inks consisting of the yellow ink according to an embodiment of the present invention, the magenta ink described below, and the cyan ink described below or the violet ink described below is used, a printed matter with excellent color reproducibility in the red region and the green region can be obtained. The reason is that, as described above, the yellow ink containing a yellow pigment (A) having a partial structure represented by general formula (1) is excellent in the storage stability and dispersion stability, and therefore, the dispersion state of the yellow ink is not destroyed when it comes into contact with other inks. Further, although the details are unclear, it is considered that strong intermolecular interaction is not formed between the yellow pigment (A) and the magenta pigment, cyan pigment, and violet pigment described below, and thus, there is no adverse effect on the dispersion state each other during mixing. Therefore, aggregation of each of pigments, which leads to the deterioration in the color reproducibility, does not occur when the pigments are brought into contact with each other on the recording medium, and the coloring property and color reproducibility of each of the pigments can be sufficiently exhibited, and as a result, it is presumed that a printed matter with excellent color reproducibility can be obtained.

Inks used in the ink set according to an embodiment of the present invention are described below.

<Magenta Ink>

The Magenta ink contains a magenta pigment and water. Preferably, the magenta ink contains 1 to 10% by weight of a magenta pigment having a partial structure represented by general formula (2) shown below of the total mass of the magenta ink.

<Magenta Pigment>

The magenta ink contains a magenta pigment. Examples of the magenta pigment include C. I. Pigment Red 5, 7, 12, 22, 23, 31, 48 (Ca), 48 (Mn), 49, 52, 53, 57 (Ca), 57:1, 122, 146, 147, 150, 166, 179, 185, 202, 238, 242, 266, 269 and 282, and C. I. Pigment Violet 19, and two or more types may be used in combination. The total amount of the pigment listed above in the magenta ink is preferably 50% by mass or more, more preferably 70% by mass or more, still more preferably 90% by mass or more, and particularly preferably 95% by mass or more, of the total mass of the pigment contained in the magenta ink. The total amount of the pigment listed above may be 100% by mass in relative to the total mass of the pigment used. That is, the ink containing the pigment listed above as a main component is preferably the magenta ink in the present description. The pigment listed above may be used within the range satisfying the above conditions, and a pigment other than those listed above may be used in combination, for example, for adjusting the color.

In some embodiments, from the viewpoint of the color reproducibility and light resistance, the magenta ink preferably includes one or two or more selected form the group consisting of C. I. Pigment Red 48 (Ca), 48 (Mn), 122, 146, 147, 150, 185, 202, 266 and 269, and C. I. Pigment Violet 19.

In some embodiments, the magenta ink preferably includes a magenta pigment having a partial structure represented by general formula (2) shown below.

General Formula (2):

[Chemical formula 9]

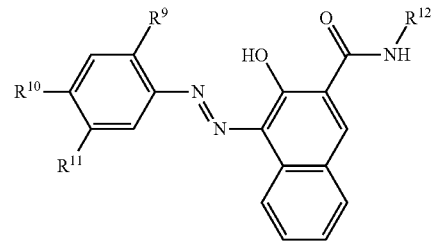

In general formula (2), each $R^9$, $R^{10}$ and $R^{11}$ is independently any one of a hydrogen atom, an alkyl group having 1 to 2 carbon atoms, an alkoxy group having 1 to 2 carbon atoms, an anilide group, a carbamoyl group, a methoxycarbonyl group, an ethoxycarbonyl group, and a sulfonamide group. $R^{12}$ is any one of a hydrogen atom, an alkyl group having 1 to 2 carbon atoms, and a structure represented by general formula (3) shown below.

The anilide group is also referred to as a phenylaminocarbonyl group and can be represented by "—CO—NH—$C_6H_5$". The sulfonamide group may be a substituted or unsubstituted aminosulfonyl group and can be represented by, for example, "—$SO_2$—$NH_2$" or "—$SO_2$—$NHCH_3$".

General Formula (3):

[Chemical formula 10]

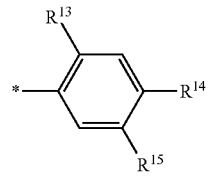

In general formula (3), $R^{13}$ is any one of a hydrogen atom, a chlorine atom, a bromine atom, an alkyl group having 1 to 2 carbon atoms, an alkoxy group having 1 to 2 carbon atoms, an amino group, and a nitro group. Each $R^{14}$ and $R^{15}$ is independently any one of a hydrogen atom, a chlorine atom, a bromine atom, an alkyl group having 1 to 2 carbon atoms, an alkoxy group having 1 to 2 carbon atoms, an amino group, and a nitro group, or $R^{14}$ and $R^{15}$ are bonded to each other to form an imidazolidinone ring. "*" represents a bonding site, and the structure represented by general formula (3) is bonded to a nitrogen atom in the partial structure represented by general formula (2) at the position of "*".

Among magenta pigments, a magenta ink including one or more selected from the group consisting of C. I. Pigment Red 146, 147, 150, 185, 266 and 269, which has one 1-phenylazo-2-naphthol structure in the molecular structure thereof, is particularly preferably selected because, when used in combination with the yellow ink according to an embodiment of the present invention, the magenta ink can suitably absorb incident light in the wavelength region where absorption by the yellow ink is small, and as a result, a printed matter with particularly excellent color reproducibility in the red region can be obtained.

From the viewpoint of the color reproducibility and image density, the amount of the magenta pigment is preferably 0.1 to 10% by mass, and more preferably 1 to 9.5% by mass of the total mass of the magenta ink.

Preferred embodiments of the ink set containing a magenta ink include the following:

- An ink set containing the yellow ink according to an embodiment of the present invention and a magenta ink containing a magenta pigment and water.
- An ink set containing the yellow ink according to an embodiment of the present invention and a magenta ink containing a magenta pigment having a partial structure represented by general formula (2), and water, wherein the amount of the magenta pigment having a partial structure represented by general formula (2) is 1 to 10% by mass of the total mass of the magenta ink.
- An ink set containing the yellow ink according to an embodiment of the present invention and a magenta ink containing a magenta pigment including at least one selected from the group consisting of C. I. Pigment Red 146, 147, 150, 185, 266 and 269, and water, wherein the amount of the magenta pigment is 1 to 10% by mass of the total mass the magenta pigment.

<Components Other than Magenta Pigment>

The magenta ink may contain, a pigment dispersing resin, a pigment derivative, an organic solvent, a binder resin, a surfactant, a basic organic compound, and other components in addition to the magenta pigment and water. The details of these components are the same as the case of the yellow ink described above.

<Characteristics of Magenta Ink Coated Matter>

In some embodiments, from the viewpoint of obtaining a printed matter having excellent color reproducibility in the red region when used in combination with the yellow ink according to an embodiment of the present invention, the magenta ink preferably has the hue angle ∠Hm° of a magenta ink coated matter having a wet film thickness of 6 µm prepared in the same manner as the yellow ink of 330 to 360°. The spectral reflectance of the coated matter is preferably 10% or less in the wavelength region of 480 to 580 nm.

Further, from the viewpoint of obtaining a printed matter with excellent light resistance, it is preferable to select a pigment having a blue-wool scale of grade 4 or higher using the third exposure method of the "Test methods for color fastness to xenon arc lamp light" specified in JIS L 0843 as the magenta pigment.

On the other hand, in some other embodiments, from the viewpoint that a printed matter with excellent color reproducibility can be produced by an ink set including a chromatic ink consisting of three types of inks of the yellow ink according to an embodiment of the present invention, the magenta ink, and the cyan ink described below or the violet ink described below, it is preferable that the hue angle ∠Hm° of the magenta ink coated matter having a wet film thickness of 6 µm produced in the same manner as in the case of the yellow ink is 0 to 45°. Further, also in these embodiments, the spectral reflectance of the coated matter is preferably 10% or less in the wavelength region of 480 to 580 nm.

<Ink Other than Yellow Ink and Magenta Ink>

The ink set may contain an ink other than the yellow ink and the magenta ink from the viewpoint of obtaining a printed matter with excellent color reproducibility. Among the ink, from the viewpoint of further enhancing the color reproducibility in the red region, it is preferable to contain an orange ink and/or a red ink in addition to the yellow ink and the magenta ink.

<Orange Ink>

For example, when an orange ink is used in addition to the yellow ink and the magenta ink, examples of the pigment contained in the orange ink include one or more selected from the group consisting of C. I. Pigment Orange 5, 13, 16, 34, 36, 38, 43, 62, 64, 67, 71 and 72, and C. I. Pigment Red 17, 49:2, 112, 149, 178, 188 and 264. Among them, from the viewpoint of the color reproducibility and light resistance in the red region to orange region, and the discharge stability, C. I. Pigment Orange 43 is preferably included.

From the viewpoint of the color reproducibility and image density, the amount of the pigment contained in the orange ink is preferably 0.1 to 10% by mass, and more preferably 2 to 9.5% by mass of the total mass of the orange ink.

When the orange ink is used, the magenta pigment described above is preferably contained in addition to the pigment described above. This is because the inclusion of the magenta pigment further enhances the color reproducibility of the red region.

When the orange ink contains the magenta pigment, the magenta pigment is preferably contained in an amount of 0.5 to 49% by mass, more preferably 1 to 45% by mass, and particularly preferably 1.5 to 40% by mass, relative to the total mass of the pigment contained in the orange ink.

<Red Ink>

When a red ink is used in addition to the yellow ink and the magenta ink, examples of the pigment contained in the red ink include one or more selected from the group consisting of C. I. Pigment Red 177, 254 and 255, and C. I. Pigment Orange 73. Among them, form the view point of the color reproducibility and light resistance in the red region and the discharge stability, C. I. Pigment Red 254 is preferably included.

From the viewpoint of the color reproducibility and image density, the amount of the pigment contained in the red ink is preferably 0.1 to 10% by mass, and more preferably 1 to 9.5% by mass of the total mass of the red ink.

<Cyan Ink>

In an embodiment of the present invention, an ink set containing a cyan ink in addition to the yellow ink and the magenta ink (and, the orange ink and/or the red ink as desired) can be preferably used. The cyan ink contains a cyan pigment and water. Examples of the cyan pigment contained in the cyan ink include C. I. Pigment Blue 1, 2, 3, 15:3, 15:4, 15:6, 16 and 22. In the cyan ink, the total amount of the pigment listed above is preferably 50% by mass or more, more preferably 70% by mass or more, still more preferably 90% by mass or more, and particularly preferably 95% by mass or more, of the total mass of the pigment contained in the cyan ink. The total amount of the pigment listed above with respect to the total mass of pigment used may be 100% by mass. Among them, when used in combination with the magenta ink having the hue angle ∠Hm° of the coated matter of 330 to 360°, one or more selected from the group consisting of C. I. Pigment Blue 15:3 and C. I. Pigment Blue 15:4 are preferably included.

On the other hand, when used in combination with the magenta ink having the hue angle ∠Hm° of the coated matter of 0 to 45°, from the viewpoint that a printed matter with excellent color reproducibility can be produced even with an ink set containing the chromatic ink consisting of three types of inks of the yellow ink according to an embodiment of the present invention, the magenta ink, and the cyan ink, it is preferable to use a cyan ink containing C.I. Pigment Blue 15:6.

From the viewpoint of the color reproducibility and image density, the amount of the cyan pigment contained in the cyan ink is preferably 0.1 to 10% by mass, and more preferably 1 to 9.5% by mass of the total mass of the cyan ink.

The cyan ink may contain a pigment dispersing resin, a pigment derivative, an organic solvent, a binder resin, a surfactant, a basic organic compound, and other components in addition to the cyan pigment and water. The details of these components are, for example, the same as in the case of the yellow ink described above.

Preferred embodiments of the ink set containing a cyan ink include the following:
- An ink set containing the yellow ink according to an embodiment of the present invention, a magenta ink, and a cyan ink, wherein the cyan ink includes at least one selected from the group consisting of C. I. Pigment Blue 15:3 and C. I. Pigment Blue 15:6.
- An ink set containing a chromatic ink, wherein the chromatic ink consists of the yellow ink according to an embodiment of the present invention, a magenta ink, and a cyan ink including at least one selected from the group consisting of C. I. Pigment Blue 15:3 and C. I. Pigment Blue 15:6. The ink set may further include an achromatic ink.
- An ink set consisting of the yellow ink according to an embodiment of the present invention, a magenta ink, a cyan ink including at least one selected from the group consisting of C. I. Pigment Blue 15:3 and C. I. Pigment Blue 15:6, and an achromatic ink.

In the above, for example, the achromatic ink consists of at least one selected from the group consisting of a black ink, a light black (gray) ink, and a white ink.

<Violet Ink>

In an embodiment of the present invention, an ink set containing a violet ink in addition to the yellow ink and the magenta ink (and, the orange ink and/or the red ink as desired) can be preferably used. The violet ink contains a violet pigment and water. Examples of the violet pigment contained in the violet ink include C. I. Pigment Violet 1, 3, 23, 27, 32, 36, 37 and 38. In the violet ink, the total amount of the pigment listed above is preferably 50% by mass or more, more preferably 70% by mass or more, still more preferably 90% by mass or more, and particularly preferably 95% by mass or more of the total mass of the pigment contained in the violet ink. The total amount of the pigment listed above with respect to the total mass of pigment used may be 100% by mass. Among them, when the yellow ink according to an embodiment of the present invention is used in combination with the magenta ink having the hue angle ∠Hm° of the coated matter of 0 to 45°, from the viewpoint that the printed matter with the excellent color reproducibility can be produced even with an ink set consisting of three types of inks, one or more selected from the group consisting of C. I. Pigment Violet 3, 23, 27 and 32 are preferably included, From the viewpoint of the color reproducibility and image density, the amount of the violet pigment contained in the violet ink is preferably 0.1 to 10% by mass, and more preferably 1 to 9.5% by mass of the total mass of the violet ink.

The violet ink may contain a pigment dispersing resin, a pigment derivative, an organic solvent, a binder resin, a surfactant, a basic organic compound, and other components in addition to the violet pigment and water. The details of these components are, for example, the same as in the case of the yellow ink described above.

Preferred embodiments of the ink set containing a violet ink include the following:
- An ink set containing the yellow ink according to an embodiment of the present invention, a magenta ink, and a violet ink, wherein the violet ink includes at least one selected from the group consisting of C. I. Pigment Violet 3, 23, 27 and 32.
- An ink set containing a chromatic ink, wherein the chromatic ink consists of the yellow ink according to an embodiment of the present invention, a magenta ink, and a violet ink including at least one selected from the group consisting of C. I. Pigment Violet 3, 23, 27 and 32. The ink set may further include an achromatic ink.
- An ink set consisting of the yellow ink according to an embodiment of the present invention, a magenta ink, a violet ink including at least one selected from the group consisting of C. I. Pigment Violet 3, 23, 27 and 32, and an achromatic ink.

In the above, for example, the achromatic ink consists of at least one selected from the group consisting of a black ink, a light black (gray) ink, and a white ink.

In the present description, the cyan ink and the violet ink are distinguished by the color index name of the pigment mainly contained in the ink. That is, an ink containing C. I. Pigment Blue pigment as a main component is referred to as a cyan ink, and an ink containing C. I. Pigment Violet pigment as a main component is referred to as a violet ink. In the case of an ink containing the same amounts of C. I. Pigment Blue pigment and C. I. Pigment Violet pigment, the ink having the hue angle ∠Hb° of the ink coated matter having a wet film thickness of 6 μm produced in the same manner as in the case of the yellow ink of 200° or more but less than 260° is defined as a cyan ink, and the ink having the hue angle ∠Hb° of 260° or more but less than 330° is defined as a violet ink. However, even if the ink contains C. I. Pigment Blue pigment and/or C. I. Pigment Violet pigment as a main component, if the hue angle ∠Hb° of the ink coated matter is less than 200°, the ink is regarded as a green ink described below, and if the hue angle ∠Hb° is 330° or more, the ink is regarded as a magenta ink described above. Here, the main component refers to the pigment having the largest amount based on the total mass of the pigment.

<Other Color Inks>

The ink set can be further combined with a green ink and/or a brown ink to enhance the color reproducibility in the whole color region. When the green ink is used, examples of the pigment contained in the green ink include one or more selected from the group consisting of C. I. Pigment Green 7, 36 and 58.

In addition, a light color ink such as a light yellow ink, a light cyan ink, a light magenta ink, and a gray ink, which are inks with a low pigment concentration, can be used together depending on the applications and image quality. When the light yellow ink is used in combination, the yellow pigment (A) used in the yellow ink is preferably used. In this case, it is particularly preferable to use the yellow pigment (A) and the basic organic compound (B) together in the light yellow ink.

<Black Ink>

The ink set may further include a black ink. By using the black ink in combination, it is possible to obtain high definition images having excellent text expression and contrast expression.

Examples of the pigment in the black ink include an organic pigment such as aniline black, Lumogen black and azomethine black, and an inorganic pigment such as a carbon black and iron oxide. A plurality of color pigments such as a yellow pigment, a magenta pigment, and a cyan pigment may be used as the composite black.

As the carbon black pigment, a carbon black produced using the furnace method or the channel method is preferable. Among these carbon blacks, those having characteristics such as a primary particle size of 11 to 40 mum (nm), a specific surface area by the BET method of 50 to 400 m$^2$/g, a volatile fraction of 0.5 to 10% by mass, and a pH value of 2 to 10 are preferable. Examples of commercially available products having such characteristics include No. 25, 30, 33, 40, 44, 45, 52, 850, 900, 950, 960, 970, 980, 1000, 2200B, 2300, 2350, 2600; MA7, MAS, MA77, MA100, MA230 (manufactured by Mitsubishi Chemical Corporation), RAVEN760UP, 780UP, 860UP, 900P, 1000P, 1060UP, 1080UP, 1255 (manufactured by Columbian Chemicals Co., Inc.), REGAL330R, 400R, 660R, MOGUL L (manufactured by Cabot Corporation), Nipex160IQ, 170IQ, 35, 75; PrinteX30, 35, 40, 45, 55, 75, 80, 85, 90, 95, 300; Special Black 350, 550; and Nerox 305, 500, 505, 600, 605 (manufactured by Orion Engineered Carbons S.A.), all of which are preferably used.

The amount of the pigment contained in the black ink is preferably 0.1 to 10% by mass, and more preferably 1 to 9.5% by mass of the total mass of the black ink.

<White Ink>

The ink set can include a white ink. By using the white ink in combination, a printed matter with good legibility can be formed on a transparent recording medium or a recording medium having low brightness. In particular, when used in combination with the yellow ink according to an embodiment of the present invention, it is possible to obtain a clear and high definition printed matter on the recording medium described above as well as when recording on a white medium.

The pigment that can be used for the white ink include an inorganic white pigment and an organic white pigment. Among them, examples of the inorganic white pigment include alkaline earth metal sulfates such as barium sulfate, alkaline earth metal carbonates such as calcium carbonate, silica such as fine powder silicic acid and synthetic silicates, calcium silicate, alumina, alumina hydrate, titanium oxide, zinc oxide, talc, clay and the like. Titanium oxide is most preferable from the viewpoint of hiding power and coloring power.

The average particle size of the white pigment is preferably 50 to 500 nm. By ensuring the average particle size within the range described above, it is possible to achieve all of the hiding property, storage stability, and discharge stability. The size is more preferably 100 to 400 nm.

The amount of the pigment contained in the white ink is preferably 3 to 50% by mass, and more preferably 5 to 30% by mass of the total mass of the white ink.

<Inkjet Printing System>

The yellow ink or the ink set according to an embodiment of the present invention is printed on a recording medium by the inkjet printing system. As the inkjet printing system, both a single-pass system in which the inkjet ink is discharged to a recording medium only once for recording, and a serial method in which discharge and recording are performed while reciprocally scanning a short shuttle head in a direction perpendicular to the conveyance direction of the recording medium may be adopted.

Further, there are no particular limitations on the system of discharging the ink, and it is possible to use all known systems such as, for example, a charge control system of discharging the ink by using an electrostatic attraction force; a drop on demand system (a pressure pulse system) using vibration pressure of the piezo element; an acoustic inkjet system of changing an electric signal into an acoustic beam and irradiating the ink to discharge the ink using radiation pressure; and a thermal inkjet (bubble Jet [registered trademark]) system of heating the ink to form bubbles and using the generated pressure. The inkjet heads used for discharging the ink may be both an on-demand system and a continuous system.

From the view point that the effect of reducing a load during drying is large, and the color reproducibility and other image quality are improved, the amount of ink droplets discharged from the inkjet head is preferably 0.2 to 50 picoliter, and more preferably 1 to 30 picoliter.

An inkjet recording apparatus mounted with the inkjet heads preferably further includes an ink drying mechanism. Examples of the drying method used in the drying mechanism includes a heated drying method, a hot air drying method, an infrared ray (for example, infrared light with a wavelength of 700 to 2,500 nm) drying method, a microwave drying method, and a drum drying method.

From the viewpoint of preventing liquid components in the ink from bumping and obtaining a printed matter with excellent color reproducibility and other image quality, when the heated drying method is adopted, the drying temperature is preferably 35 to 100° C., and when the hot air drying method is adopted, the hot air temperature is preferably 50 to 250° C. From the same viewpoint, when the infrared drying method is adopted, it is preferable that 50% or more of the integrated value of the total output of infrared rays used for infrared irradiation exists in a wavelength region of 700 to 1,500 nm.

The drying method may be used alone, or a plurality of drying methods may be used in succession, or may be used in combination at the same time. For example, by using the heated drying method and the hot air drying method together, the ink can be dried more quickly than when each of them is used alone.

<Recording Medium>

The recording medium on which the yellow ink or the ink set is printed is not particularly limited. For example, a paper substrate such as a high-quality paper, a coated paper, an art paper, a cast paper, and a synthetic paper; a plastic substrate such as polycarbonate, hard vinyl chloride, soft vinyl chloride, polystyrene, foamed styrol, PMMA, polypropylene, polyethylene, and PET; a metal substrate such as stainless steel; glass; and wood can be used. The yellow ink or the ink set can be suitably used not only on a high-absorption substrate such as an inkjet paper or a high-quality paper which have an absorbent layer, but also on a low-absorption substrate such as a coated paper, an art paper, and a vinyl chloride sheet which are commonly used in industrial applications.

EXAMPLES

Hereinafter, the present invention is described in more detail with reference to examples and comparative examples.

In the following description, "parts", "%" and "ratio" are based on mass unless otherwise specified.

The yellow pigments used in the examples are as shown below.

SYMULER FAST YELLOW GFCONC
(C. I. Pigment Yellow 12, manufactured by DIC Corporation)

SYMULER FAST YELLOW 4090 G
(C. I. Pigment Yellow 14, manufactured by DIC Corporation)

HANSA YELLOW 5GX01
(C. I. Pigment Yellow 74, manufactured by Clariant AG)

Irgazin Yellow L 1030
(C. I. Pigment Yellow 109, manufactured by BASF Corporation)

Irgazin Yellow D 1999
(C. I. Pigment Yellow 110, manufactured by BASF Corporation)

Paliotol Yellow D 0960
(C. I. Pigment Yellow 138, manufactured by BASF Corporation)

Paliotol Yellow D 1819
(C. I. Pigment Yellow 139, manufactured by BASF Corporation)

PV Fast Yellow P-HG
(C. I. Pigment Yellow 180, manufactured by Clariant AG)

Paliotol Yellow D 1155
(C. I. Pigment Yellow 185, manufactured by BASF Corporation)

TCY 18501 L
(C. I. Pigment Yellow 185, manufactured by Trust Chem Co., Ltd.)

Inkjet Yellow H5G
(C. I. Pigment Yellow 213, manufactured by Clariant AG)

<Measurement Method of Amount of Impurities in Pigment>

To a 250 ml wide-mouthed bottle (Iboy [registered trademark] manufactured by AS ONE Corporation) made of polypropylene, 95 g of an ion-exchanged water and 5 g of the pigment were added and sealed. After stirring and mixing with a shaker for 1 hour, the obtained sample was left in an oven at 70° C. for 7 days. Then, the sample was cooled to a room temperature, and the residue in the sample was removed by decantation. The remaining supernatant was then centrifuged using a centrifuge (HIMAC CP-100 manufactured by Hitachi Koki Co., Ltd.) at 30,000 rpm for 6 hours. Next, the amount of impurities in the pigment was calculated by measuring the amount of the solid fraction contained in the supernatant liquid after removing the precipitates.

The measurement method of the amount of the solid fraction was as follows. A portion of the supernatant was added to an aluminum container whose mass had been previously measured (the mass is W1), and the total mass was measured (the total mass is W2). Then, the aluminum container was left at a temperature of 80° C. until the liquid component was completely evaporated, and then the total mass was measured again (the total mass is W3). The amount of the solid fraction was calculated by the formula: $95 \times [(W3-W1) \div (W2-W1)]$.

<Production of Varnish of Pigment Dispersing Resin 1>

To a mixing container equipped with a stirrer, 20.2 parts of the styrene acrylic resin X-1 (weight average molecular weight: 18,000, acid value: 110 mgKOH/g) manufactured by SEIKO PMC CORPORATION, 3.8 parts of dimethylaminoethanol, and 76.0 parts of water were added, and the acid group of the styrene acrylic resin were 100% neutralized and dissolved by sufficiently stirring. Then, 1 g of the solution was sampled and dried by heating at 180° C. for 20 minutes, the amount of the non-volatile fraction was measured, and then water was added so that the amount of the non-volatile fraction becomes 20% to obtain a varnish of the pigment dispersing resin 1 (non-volatile fraction: 20%).

<Production Example of Yellow Pigment Dispersion 1>

To a mixing container equipped with a stirrer, 20 parts of SYMULER FAST YELLOW GFCONC, 36 parts of the varnish of the pigment dispersing resin 1, and 44 parts of water were added and pre-dispersed with the stirrer, then, the main dispersion was carried out for 2 hours using a Dyno-Mill having a volume of 0.6 L filled with 1,800 g of zirconia beads with a size of 0.5 mm to obtain a yellow pigment dispersion 1. The ratio of the pigment to the pigment dispersing resin 1 (non-volatile fraction) was pigment/pigment dispersing resin 1 (non-volatile fraction)=100/36.

<Production Examples of Yellow Pigment Dispersions 2 to 11>

Yellow pigment dispersions 2 to 11 were produced in the same manner as in the yellow pigment dispersion 1 except that the types of pigments were changed to those shown in Table 1. Table 1 also describes the amount of the impurities in the pigments measured using the method described above.

TABLE 1

| Yellow pigment dispersion | Pigment | Amount of impurities in pigment |
|---|---|---|
| Yellow pigment dispersion 1 (PY12 dispersion 1) | SYMULER FAST YELLOW GFCONC | 2.3% |
| Yellow pigment dispersion 2 (PY14 dispersion 2) | SYMULER FAST YELLOW 4090G | 2.0% |
| Yellow pigment dispersion 3 (PY74 dispersion) | HANSA YELLOW 5GX01 | 2.5% |
| Yellow pigment dispersion 4 (PY109 dispersion) | Irgazin Yellow L 1030 | 5.5% |
| Yellow pigment dispersion 5 (PY110 dispersion) | Irgazin Yellow D 1999 | 6.1% |
| Yellow pigment dispersion 6 (PY138 dispersion) | Paliotol Yellow D 0960 | 4.9% |
| Yellow pigment dispersion 7 (PY139 dispersion) | Paliotol Yellow D 1819 | 4.5% |
| Yellow pigment dispersion 8 (PY180 dispersion) | PV Fast Yellow P-HG | 3.4% |
| Yellow pigment dispersion 9 (PY185 dispersion 1) | Paliotol Yellow D 1155 | 7.0% |
| Yellow pigment dispersion 10 (PY185 dispersion 2) | TCY 18501L | 4.5% |
| Yellow pigment dispersion 11 (PY213 dispersion) | Inkjet Yellow H5G | 3.0% |

<Production of Aqueous Dispersion of Olefin Resin Microparticles 1>

To a mixing container equipped with a stirrer, 45 parts of a polyethylene wax (melting point: about 115° C.), 45 parts of an acid group-containing polyolefin (acid value: 17 mgKOH/g, melting point: about 100° C., oxidized polyethylene wax), and 10 parts of a polyoxyethylene stearyl ether were added and heated while stirring to melt. Then, after adding 1.0 part of dimethylaminoethanol, 110 parts by mass of hot water at 90° C. or higher was added little by little with stirring thoroughly to cause the phase inversion and emulsification. After cooling the obtained emulsion to a room temperature, water was added to adjust the amount of the non-volatile fraction to be 30% by mass to obtain an aqueous dispersion of an olefin resin microparticles 1.

<Production of Aqueous Dispersions of Olefin Resin Microparticles 2 to 3>

An aqueous dispersion of an olefin resin microparticles 2 (non-volatile fraction: 30% by mass) was produced in the same manner as in the aqueous dispersion of the olefin resin microparticles 1 except that the acid group-containing polyolefin was changed to a oxidized polyethylene wax having an acid value of 41 mgKOH/g and a melting point of about 140° C., the amount added of the polyethylene wax was 32 parts, the amount added of the acid group-containing polyolefin was 58 parts, and the amount added of dimethylaminoethanol was 2.3 parts.

Further, an aqueous dispersion of an olefin resin microparticles 3 (non-volatile fraction: 30% by mass) was produced in the same manner as in the aqueous dispersion of the olefin resin microparticles 2 except that the acid group-containing polyolefin was changed to an acid-modified polyethylene wax having an acid value of 60 mgKOH/g and a melting point of about 105° C. and the amount added of dimethylaminoethanol was 3.4 parts.

Examples 1 to 7, and Comparative Examples 1 to 6

<Production of Water-Based Yellow Inks 1 to 13>

Each of the yellow pigment dispersions obtained above, a binder resin (JE-1056 (solid fraction: 42.5%, particle size: 50 nm), resin microparticles manufactured by SEIKO PMC CORPORATION), a solvent, a surfactant (Surfynol 104E, an acetylenediol-based compound manufactured by Nissin Chemical Industry Co., Ltd.), a basic organic compound (B) (diethanolamine (pKa=8.9)), and water were added while stirring to a mixing container equipped with a stirrer and mixed for 1 hour so as to have the composition shown in Table 2. Next, filtration was carried out with a membrane filter having a pore size of 1 μm to remove coarse particles to obtain each of the water-based yellow inks 1 to 13. In the examples, the amount of JE-1056 shown in the table is the amount of the solid fraction.

TABLE 2

| | | | Example | | | | | | | Comparative example | | | | | |
|---|---|---|---|---|---|---|---|---|---|---|---|---|---|---|---|
| | | | 1 | 2 | 3 | 4 | 5 | 6 | 7 | 1 | 2 | 3 | 4 | 5 | 6 |
| Yellow ink composition | Yellow ink No. | | 1 | 2 | 3 | 4 | 5 | 6 | 7 | 8 | 9 | 10 | 11 | 12 | 13 |
| | Yellow pigment dispersion (Amount of pigment: 20%) | Pigment dispersion 1 P.Y.12 | 15% | | | | | | | | | | | | |
| | | Pigment dispersion 2 P.Y.14 | | | | | | | | 15% | | | | | |
| | | Pigment dispersion 3 P.Y.74 | | | | | | | | | 15% | 15% | | | |
| | | Pigment dispersion 4 P.Y.109* | | 15% | | | | | | | | | | | |
| | | Pigment dispersion 5 P.Y.110* | | | 15% | | | | | | | | | | |
| | | Pigment dispersion 6 P.Y.138* | | | | 15% | | | | | | | | | |
| | | Pigment dispersion 7 P.Y.139* | | | | | | | | | | | 15% | | |
| | | Pigment dispersion 8 P.Y.180 | | | | | 15% | | | | | | | | |
| | | Pigment dispersion 9 P.Y.185* | | | | | | 15% | | | | | | | |
| | | Pigment dispersion 10 P.Y.185* | | | | | | | 15% | | | | | 15% | |
| | | Pigment dispersion 11 P.Y.213 | | | | | | | | | | | | | 15% |
| | Binder resin | JE-1056 | 9% | 9% | 9% | 9% | 9% | 9% | 9% | 9% | 9% | 9% | 9% | 9% | 9% |
| | Organic solvent | Propylene glycol (Boiling point 188° C.) | 10% | 10% | 10% | 10% | 10% | 10% | 10% | 10% | 10% | 10% | 10% | 10% | 10% |
| | | 1,2-Butanediol (Boiling point: 194° C.) | 10% | 10% | 10% | 10% | 10% | 10% | 5% | 10% | 10% | 10% | 10% | 10% | 10% |
| | | Glycerol (Boiling point 290° C.) | | | | | | | 5% | | | | | | |
| | Surfactant | Surfynol 104E | 1% | 1% | 1% | 1% | 1% | 1% | 1% | 1% | 1% | 1% | 1% | 1% | 1% |
| | Basic organic compound (B) | Diethanolamine | 1% | 1% | 1% | 1% | 1% | 1% | 1% | 1% | 1% | 1% | 1% | 1% | 1% |
| | Water | | 54% | 54% | 54% | 54% | 54% | 54% | 54% | 54% | 54% | 54% | 54% | 54% | 54% |
| Evaluation results | Evaluation 1 | Hue L | 88.7 | 78.5 | 90.3 | 81.4 | 86.1 | 85.0 | 85.0 | 90.2 | 89.5 | 90.8 | 92.1 | 91.9 | 85.0 |
| | | Hue a | -8.2 | 24.0 | -14.0 | 10.8 | -3.6 | -4.0 | -4.3 | -6.8 | -5.4 | -8.8 | -8.5 | -10.0 | -4.0 |
| | | Hue b | 70.6 | 70.7 | 76.1 | 119.3 | 98.2 | 100.3 | 100.0 | 107.4 | 108.2 | 101.4 | 74.6 | 67.5 | 100.3 |
| | | Chroma C | 71.1 | 74.7 | 77.4 | 119.8 | 98.2 | 100.4 | 100.1 | 107.6 | 108.3 | 101.7 | 75.1 | 68.2 | 100.4 |
| | | Hue angle H | 96.6 | 71.2 | 100.5 | 84.8 | 92.1 | 95.0 | 95.0 | 93.6 | 92.9 | 95.0 | 96.5 | 98.5 | 95.0 |
| | | Image density (OD value) | 0.71 | 1.01 | 0.69 | 1.42 | 1.21 | 1.32 | 1.32 | 1.21 | 1.27 | 1.05 | 1.08 | 0.91 | 1.32 |
| | Evaluation 2 | Spectral reflectance (%) 380 nm | 6.7 | 6.3 | 12.5 | 4.4 | 3.4 | 3.2 | 3.2 | 1.1 | 1.6 | 1.7 | 4.4 | 3.5 | 3.2 |
| | | 390 nm | 6.8 | 6.0 | 11.0 | 3.2 | 2.9 | 2.5 | 2.5 | 1.1 | 1.7 | 1.6 | 3.8 | 3.0 | 2.5 |
| | | 400 nm | 6.9 | 5.7 | 6.5 | 2.3 | 2.9 | 2.5 | 2.5 | 1.1 | 1.7 | 1.6 | 3.7 | 3.0 | 2.5 |
| | | 410 nm | 7.5 | 5.9 | 5.4 | 1.6 | 3.0 | 2.6 | 2.6 | 1.2 | 1.7 | 1.5 | 3.7 | 3.2 | 2.6 |
| | | 420 nm | 7.3 | 5.7 | 4.0 | 1.2 | 3.0 | 2.8 | 2.8 | 1.3 | 1.7 | 1.4 | 3.8 | 3.5 | 2.8 |
| | | 430 nm | 7.2 | 5.4 | 2.8 | 1.1 | 3.1 | 2.8 | 2.8 | 1.3 | 1.7 | 1.5 | 4.0 | 4.2 | 2.8 |
| | | 440 nm | 7.3 | 5.2 | 3.8 | 1.1 | 3.2 | 2.9 | 2.9 | 1.4 | 1.8 | 1.6 | 4.5 | 5.6 | 2.9 |

TABLE 2-continued

| | | | Example | | | | | | | Comparative example | | | | | |
|---|---|---|---|---|---|---|---|---|---|---|---|---|---|---|---|
| | | 1 | 2 | 3 | 4 | 5 | 6 | 7 | 1 | 2 | 3 | 4 | 5 | 6 |
| | 450 nm | 7.7 | 5.0 | 3.9 | 1.1 | 3.0 | 2.9 | 2.9 | 1.5 | 1.8 | 1.8 | 5.5 | 8.0 | 2.9 |
| | 460 nm | 9.0 | 4.9 | 3.2 | 1.4 | 3.1 | 2.9 | 2.9 | 1.8 | 1.8 | 2.1 | 7.3 | 12.4 | 2.9 |
| | 470 nm | 11.9 | 4.9 | 11.7 | 2.3 | 3.6 | 3.3 | 3.3 | 2.1 | 1.9 | 2.8 | 10.8 | 19.3 | 3.3 |
| | 480 nm | 16.6 | 4.9 | 38.2 | 2.9 | 4.3 | 3.9 | 3.9 | 3.4 | 2.3 | 6.3 | 18.0 | 29.5 | 3.9 |
| Evaluation 3 | Light resistance Grade | 6 | 5 | 5 | 4 | 4 | 4 | 3 | 2 | 2 | 4 | 5 | 7 | 3 |
| Evaluation 4 | Storage stability | C | B | B | B | C | C | B | D | B | B | D | C | B |
| Evaluation 5 | Hue change of time elapsed yellow ink | A | A | A | A | A | A | A | B | A | B | B | A | B |

In Table 2, the pigments marked with "*" correspond to the yellow pigment (A). Table 2 also shows the results of evaluations 1 to 5 described below.

<Preparation of Yellow Ink Coated Matter>

Each of the water-based yellow inks 1 to 13 obtained above was applied on UPM Finesse Gloss paper manufactured by UPM Corporation, and coating was performed by using K control coater K202 manufactured by Matsuo Sangyo Co., Ltd., and wire bar No. 1 (wet thickness of coating: 6 μm), and then dried in an oven at 80° C. for 1 minute or more to produce a coated matter. The obtained yellow ink coated matters were evaluated for the hue, image density (OD values), spectral reflectance, and light resistance shown below.

<Evaluation 1: Measurement of Hue and Image Density of Yellow Ink Coated Matter>

The hue and image density of each of the yellow ink coated matters obtained above were measured using i1Pro2 manufactured by X-Rite Inc. under the conditions of a light source D50, a view angle 2°, and a CIE color system. The chroma C and the hue angle ∠H° were calculated from the obtained a* and b*. The chroma C was calculated using formula (11) shown below, and the hue angle ∠H° was calculated using the formula described above.

$$C=\sqrt{(a^{*2}+b^{*2})} \quad \text{Formula (11):}$$

The chroma C is a practically usable level if it is 70 or more, a preferable level for practical use if it is 85 or more, and a particularly preferable level for practical use if it is 95 or more. The hue angle ∠H° is a practically usable level if it is 70 to 105°, a preferable level for practical use if it is 76 to 102°, and a particularly preferable level for practical use if it is 82 to 98°. Further, the image density (OD value) is desirably 0.65 or more, preferably 1.0 or more, and particularly preferably 1.1 or more.

<Evaluation 2: Measurement of Spectral Reflectance of Yellow Ink Coated Matter>

The spectral reflectance in the wavelength region of 380 to 480 nm of each of the yellow ink coated matters obtained above was measured in every 10 nm using i1Pro2 manufactured by X-Rite Inc. under the conditions of a light source D50, a view angle 2°, and a CIE color system. As described above, it is preferable that the spectral reflectance is 10% or less in the entire wavelength region described above.

<Evaluation 3: Light Resistance Test of Yellow Ink Coated Matter>

The light resistance test was conducted using the yellow ink coated matters obtained above and 2 to 7 grade standard blue dyed fabrics (blue scales) specified in JIS L 0841:2004, in accordance with the third exposure method specified in JIS L 0843:2006 "Test methods for color fastness to xenon arc lamp light", using a xenon weather meter SX 75 manufactured by Suga Test Instruments Co., Ltd. under the conditions of irradiance 60 W, a black panel temperature 63° C., and 50% RH. Next, the light resistance of the yellow ink coated matter was determined by grade by visually determining the degree of fading when the blue scale of each grades faded. The results are shown in Table 2, and grade 3 and above was determined as a practically usable level, and grade 6 and above was determined as a preferable level for practical use.

<Evaluation 4: Storage Stability Test of Yellow Ink>

After measuring the viscosity of the water-based yellow inks 1 to 13 by using an E-type viscometer (TVE25L-type viscometer manufactured by Toki Sangyo Co., Ltd.), the water-based yellow inks 1 to 13 were store in an oven at 70° C. Then, the water-based yellow inks were taken out every day, the viscosity was measured again using the same method as described above, and the range of change of the viscosity was confirmed to evaluate the storage stability. The evaluation criteria were as follows, and evaluations of A, B, and C were determined as a practically usable level.

A: The range of change was +0.5 mPa's or less after 4 weeks of storage at 70° C.

B: The range of change was +0.5 mPa's or more after 2 weeks or more but less than 4 weeks of storage at 70° C.

C: The range of change was +0.5 mPa's or more after 1 week or more but less than 2 weeks of storage at 70° C.

D: The range of change was +0.5 mPa's or more after less than 1 week of storage at 70° C.

<Evaluation 5: Evaluation of Hue Change of Time Elapsed Yellow Ink>

The water-based yellow inks 1 to 13 were stored in an oven at 70° C. for 2 weeks to prepare time elapsed yellow inks 1 to 13. Then, coated matters (wet film thickness: 6 μm) of the time elapsed yellow inks 1 to 13 were prepared in the same manner as in the yellow ink coated matters described above, and the hue change was evaluated by visually comparing with the yellow ink coated matters 1 to 13 which had not been time elapsed. The evaluation criteria were as follows, and evaluation of A was determined as a practically usable level.

A: No hue change was observed by visual comparison.

B: A hue change was observed by visual comparison.

As for the yellow inks 1 to 7 (Examples 1 to 7), the chroma C and the hue angle ∠H° defined in the CIELAB color space were at least a practically usable level or higher, the light resistance was 3 grade or more, and the evaluation results regarding the storage stability and the hue change of the time elapsed yellow ink were also at a practically usable level. In particular, C. I. Pigment Yellow 139 and 185 which were used in the yellow inks 4 to 7 (Examples 4 to 7) had the chroma C and the hue angle ∠H° at a preferable level for practical use, had a high image density (OD value), and also had a spectral reflectance in the 380 to 480 nm wavelength region of 10% or less. C. I. Pigment Yellow 139 and 185 therefore can produce a high concentration yellow ink having extremely high image density in addition to the color reproducibility and light resistance.

Although the yellow inks 5 and 6 (Examples 5 and 6) used the same C. I. Pigment Yellow 185, a difference in the image density was found. It is considered that the pigment used in the yellow ink 6 had the amount of impurities of 5% by mass or less, so that foaming and/or inhibition of the adsorption of the pigment dispersing resin could be suppressed during dispersion.

On the other hand, C. I. Pigment Yellow 12 and 14 used in the yellow inks 8 and 9 (Comparative Examples 1 and 2) are yellow pigments generally used in offset printing and gravure printing. If these pigments are used, the chroma C and the hue angle ∠H° defined in the CIELAB color space are a particularly preferable level for practical use, and the spectral reflectance in the wavelength region of 380 to 480 nm can be suppressed to 10% or less, and therefore it is possible to produce a high concentration yellow ink. However, the light resistance is as low as grade 2, and in the ink 8, the evaluation results regarding the storage stability and the hue change of the time elapsed yellow ink were also at a problematic level for practical use.

C. I. Pigment Yellow 213 used in the yellow ink 12 (Comparative Example 5) had excellent light resistance of grade 7, and evaluation results regarding the storage stability and the hue change of the time elapsed yellow ink were practically usable levels. However, it was confirmed that the chroma C defined in the CIELAB color space was less than 70, and the printed matter was inferior in the color reproducibility.

In addition, it has been found that the pigment used in the yellow inks 10 and 11 (Comparative Examples 3 and 4) is a yellow ink which had a poor evaluation result regarding the hue change of the time elapsed yellow ink and was able to cause discoloration and fading over time.

On the other hand, the yellow ink 13 (Comparative Example 6) was an ink having a boiling point of 240° C. or higher and the amount of the organic solvent of more than 5% by mass, and it was confirmed that the hue change of the time elapsed yellow ink was inferior to the yellow inks 6 and 7 (Examples 6 and 7) using the same pigment.

Examples 8 to 19, and Comparative Examples 7 to 15

<Production of Yellow Inks 14 to 34>

In order to confirm effects of the basic organic compound (B), the yellow inks 14 to 34 having the composition shown in Table 3 were produced in the same manner as in the water-based yellow ink 1 to 13. Next, the yellow inks 14 to 34 obtained were subjected to the storage stability test using the method described above. Further, after preparing yellow ink coated matters (wet film thickness: 6 μm) using the method described above, the light resistance was evaluated using the method described above. The evaluation results of the storage stability and the light resistance of the yellow inks 14 to 34 are as shown in Table 3.

TABLE 3

| | | | | Comparative example | | Example | | | | |
|---|---|---|---|---|---|---|---|---|---|---|
| | | | | 7 | 8 | 8 | 9 | 10 | 11 | 12 |
| Yellow ink composition | Yellow ink No. | | | 14 | 15 | 16 | 17 | 18 | 19 | 20 |
| | Yellow pigment dispersion (Amount of pigment 20%) | Pigment dispersion 2 | P.Y.14 | | | | | | | |
| | | Pigment dispersion 5 | P.Y.110* | | | 15% | | | 15% | |
| | | Pigment dispersion 7 | P.Y.139* | 15% | | | 15% | | | 15% |
| | | Pigment dispersion 10 | P.Y.185* | | 15% | | | 15% | | |
| | Binder resin | JE-1056 | | 9% | 9% | 9% | 9% | 9% | 9% | 9% |
| | Organic solvent | Propylene glycol | | 10% | 10% | 10% | 10% | 10% | 10% | 10% |
| | | 1,2-Butanediol | | 10% | 10% | 10% | 10% | 10% | 10% | 10% |
| | Surfactant | Surfynol 104E | | 1% | 1% | 1% | 1% | 1% | 1% | 1% |
| | Basic organic compound (B) | Diethanolamine | | | | | | | | |
| | | Methyldiethanolamine | | | | 1.0% | 1.0% | 1.0% | | |
| | | Triethanolamine | | | | | | | 1.0% | 1.0% |
| | Other basic organic compound | Diethylaminoethanol | | 1.0% | 1.0% | | | | | |
| | | Water | | 54.0% | 54.0% | 54.0% | 54.0% | 54.0% | 54.0% | 54.0% |
| Evaluation results | Evaluation 3 | Light resistance Grade | | 3 | 2 | 5 | 5 | 4 | 6 | 5 |
| | Evaluation 4 | Storage stability | | D | D | B | B | C | 8 | B |

| | | | | Example | Com. example | Example | | | | Comparative example |
|---|---|---|---|---|---|---|---|---|---|---|
| | | | | 13 | 9 | 14 | 15 | 16 | 17 | 10 |
| Yellow ink composition | Yellow ink No. | | | 21 | | 22 | 24 | 25 | 26 | 27 |
| | Yellow pigment dispersion (Amount of pigment 20%) | Pigment dispersion 2 | P.Y.14 | | | | | | | |
| | | Pigment dispersion 5 | P.Y.110* | | | | | | | |
| | | Pigment dispersion 7 | P.Y.139* | | 15% | 15% | 15% | 15% | 15% | |
| | | Pigment dispersion 10 | P.Y.185* | 15% | | | | | | 15% |
| | Binder resin | JE-1056 | | 9% | 9% | 9% | 9% | 9% | 9% | 9% |
| | Organic solvent | Propylene glycol | | 10% | 10% | 10% | 10% | 10% | 10% | 10% |
| | | 1,2-Butanediol | | 10% | 10% | 10% | 10% | 10% | 10% | 10% |
| | Surfactant | Surfynol 104E | | 1% | 1% | 1% | 1% | 1% | 1% | 1% |
| | Basic organic compound (B) | Diethanolamine | | | | | | | | |
| | | Methyldiethanolamine | | | | | | | | |
| | | Triethanolamine | | 1.0% | | 0.1% | 0.5% | 0.9% | 0.95% | |
| | Other basic organic compound | Diethylaminoethanol | | | | | | | | |
| | | Water | | 54.0% | 55.0% | 54.9% | 54.5% | 54.1% | 54.05% | 55.0% |
| Evaluation results | Evaluation 3 | Light resistance Grade | | 4 | 5 | 6 | 6 | 5 | 4 | 5 |
| | Evaluation 4 | Storage stability | | B | D | C | C | A | C | D |

TABLE 3-continued

|  |  |  | Comparative example | Example | | Comparative example | | | |
|---|---|---|---|---|---|---|---|---|---|
|  |  |  | 11 | 18 | 19 | 12 | 13 | 14 | 15 |
|  | Yellow ink No. |  | 28 | 29 | 30 | 31 | 32 | 33 | 34 |
| Yellow ink composition | Yellow pigment dispersion (Amount of pigment 20%) | Pigment dispersion 2 P.Y.14 |  |  |  |  | 15% | 15% | 15% |
|  |  | Pigment dispersion 5 P.Y.110* |  |  |  |  |  |  |  |
|  |  | Pigment dispersion 7 P.Y.139* |  |  |  |  |  |  |  |
|  |  | Pigment dispersion 10 P.Y.185* | 15% | 15% | 15% | 15% |  |  |  |
|  | Binder resin | JE-1056 | 9% | 9% | 9% | 9% | 9% | 9% | 9% |
|  | Organic solvent | Propylene glycol | 10% | 10% | 10% | 10% | 10% | 10% | 10% |
|  |  | 1,2-Butanediol | 10% | 10% | 10% | 10% | 10% | 10% | 10% |
|  | Surfactant | Surfynol 104E | 1% | 1% | 1% | 1% | 1% | 1% | 1% |
|  | Basic organic compound (B) | Diethanolamine |  |  |  |  |  |  |  |
|  |  | Methyldiethanolamine |  |  |  |  |  | 1.0% |  |
|  |  | Triethanolamine | 0.05% | 0.5% | 0.9% | 1.3% |  |  | 1.0% |
|  | Other basic organic compound | Diethylaminoethanol |  |  |  |  | 1.0% |  |  |
|  |  | Water | 54.95% | 54.5% | 54.1% | 53.7% | 54.0% | 54.0% | 54.0% |
| Evaluation results | Evaluation 3 | Light resistance Grade | 5 | 5 | 5 | 3 | 2 | 2 | 2 |
|  | Evaluation 4 | Storage stability | D | C | B | D | B | A | A |

The types and the pKa value at 25° C. of the basic organic compounds used in Table 3 are as follows.
diethylaminoethanol pKa value=9.9
diethanolamine pKa value=8.9
methyldiethanolamine pKa value=8.5
triethanolamine pKa value=7.8

As for the yellow ink using C. I. Pigment Yellow 139 or 185 which is an isoindoline-based pigment as the yellow pigment (A), it was confirmed that the light resistance and storage stability improved as the pKa value of the basic organic compound used in combination decreased. In addition, when C. I. Pigment Yellow 110 which is an isoindolinone-based pigment was used, the light resistance tended to be improved.

Further, the yellow inks 22 to 31 were evaluated for the tendency when the amount of triethanolamine used as the basic organic compound (B) was changed. In both cases of C. I. Pigment Yellow 139 and 185 used for evaluation, by ensuring the amount of 0.1 to 1% of the total mass of the yellow ink, it was possible to achieve both the light resistance and storage stability.

Examples 20 to 43

<Production of Yellow Inks 35 to 58>

Subsequently, in order to confirm effects when types and/or amounts of the binder resin, the organic solvent, and the surfactant were changed, yellow inks 35 to 58 having the compositions shown in Table 4 were produced in the same manner as in the water-based yellow inks 1 to 13. Next, the storage stability of the obtained yellow inks 35 to 58 was evaluated using the method described above. Further, the color difference ΔE was evaluated using the method described below. The evaluation results of the storage stability and the color difference ΔE of the yellow inks 35 to 58 are as shown in Table 4.

TABLE 4A

| | | | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|
| | Yellow ink No. | | 35 | 36 | 37 | 38 | 39 | 40 | 41 | 42 | 43 | 44 | 45 | 46 | 47 | 48 |
| Yellow pigment dispersion (Amount of pigment: 20%) | Pigment dispersion 3 | P.Y.74 | | | | | | | | | | | | | | |
| | Pigment dispersion 7 | P.Y.139* | 15% | 15% | 15% | 15% | 15% | 15% | 15% | 15% | 15% | 15% | 15% | 15% | 15% | 15% |
| | Pigment dispersion 8 | P.Y.180 | | | | | | | | | | | | | | |
| | Pigment dispersion 10 | P.Y.185* | | | | | | | | | | | | | | |
| Binder resin | JE-1056 | | 9% | 9% | 9% | 9% | 9% | 9% | 9% | 9% | 9% | 9% | 9% | 9% | 9% | 9% |
| | Olefin resin microparticles 1 | | | | | | | | | | | | | | | |
| | Olefin resin microparticles 2 | | | | | | | | | | | | | | | |
| | Olefin resin microparticles 3 | | | | | | | | | | | | | | | |
| Organic solvent | Isopropyl alcohol | | 10% | | | | | | | | | | | | | |
| | Propylene glycol | | 10% | 10% | 10% | 10% | 10% | 10% | 10% | 5% | 15% | 20% | 15% | 15% | 15% | 15% |
| | 1,2-Butanediol | | | 10% | | | | | | 5% | 15% | 20% | 15% | 15% | 15% | 15% |
| | Ethylene glycol | | | | 10% | | | | | | | | | | | |
| | 1,3-Butanediol | | | | | 10% | | | | | | | | | | |
| | 1,2-Pantanediol | | | | | | 10% | | | | | | | | | |
| | 1,5-Pentanediol | | | | | | | 10% | | | | | | | | |
| | 1,2-Hexanediol | | | | | | | | 10% | | | | | | | |
| | 1,6-Hexanediol | | | | | | | | | | | | | | | |
| Surfactant | Surfynol 104E (HLB value = 3) | | 0.9% | 0.9% | 0.9% | 0.9% | 0.9% | 0.9% | 0.9% | 0.9% | 0.9% | 0.9% | | | | |
| | Surfynol 420 (HLB value = 4) | | | | | | | | | | | | 0.9% | | | |
| | Surfynol 440 (HLB value = 8) | | | | | | | | | | | | | 0.9% | | |
| | Surfynol 465 (HLB value = 13) | | | | | | | | | | | | | | 0.9% | 0.6% |
| | BYK-348 (HLB value =13) | | | | | | | | | | | | | | | 0.3% |
| Basic organic compound (B) | Diethanolamine | | | | | | | | | | | | | | | |
| | Methyldiethanolamine | | | | | | | | | | | | | | | |
| | Triethanolamine | | 1.0% | 1.0% | 1.0% | 1.0% | 1.0% | 1.0% | 1.0% | 1.0% | 1.0% | 1.0% | 1.0% | 1.0% | 1.0% | 1.0% |
| | Water | | 54.1% | 54.1% | 54.1% | 54.1% | 54.1% | 54.1% | 54.1% | 64.1% | 44.1% | 34.1% | 44.1% | 44.1% | 54.1% | 44.1% |
| Evaluation results | Evaluation 4 | Storage stability | C | A | A | A | A | A | A | A | A | B | A | A | A | A |
| | Evaluation 6 | Color difference | C | C | B | A | B | A | B | A | A | B | A | B | C | A |

TABLE 4B

| | | | Example | | | | | | | | | |
|---|---|---|---|---|---|---|---|---|---|---|---|---|
| | | | 34 | 35 | 36 | 37 | 38 | 39 | 40 | 41 | 42 | 43 |
| | Yellow ink No. | | 49 | 50 | 51 | 52 | 53 | 54 | 55 | 56 | 57 | 58 |
| Yellow pigment dispersion (Amount of pigment: 20%) | Pigment dispersion 3 | P.Y.74 | | | | | | | | | | 9% |
| | Pigment dispersion 7 | P.Y.139* | | | | | | | | | 10% | |
| | Pigment dispersion 8 | P.Y.180 | | | | | | | | | 10% | |
| | Pigment dispersion 10 | P.Y.185* | 15% | 15% | 15% | 15% | 15% | 15% | 15% | 15% | | 6% |
| Binder resin | JE-1056 | | 9% | 9% | 9% | 9% | 9% | 9% | 9% | 9% | 9% | 9% |
| Organic solvent | Olefin resin microparticles 1 | | | | | | 1.0% | 3.0% | | | | |
| Surfoctant | Olefin resin microparticles 2 | | | | | | | | 6.0% | | | |
| Basic organic compound (B) | Olefin resin microparticles 3 | | | | | | | | | 6.0% | | |
| | Isopropyl alcohol | | | | | | | | | | | |
| | Propylene glycol | | 15% | 15% | 15% | 15% | 15% | 15% | 15% | 15% | 15% | 15% |
| | 1,2-Butanediol | | 15% | 15% | 15% | 15% | 15% | 15% | 15% | 15% | | |
| | Ethylene glycol | | | | | | | | | | | |
| | 1,3-Butanediol | | | | | | | | | | | 15% |
| | 1,2-Peritanediol | | | | | | | | | | | |
| | 1,5-Pentanediol | | | | | | | | | | | |
| | 1,2-Hexanediol | | | | | | | | | | 15% | |
| | 1,6-Hexanediol | | | | | | | | | | | |
| | Surfynol 104E (HLB value = 3) | | | | | 0.6% | | | | | 0.9% | 0.9% |
| | Surfynol 420 (HLB value = 4) | | 0.9% | | | | 0.9% | 0.9% | 0.9% | 0.9% | | |
| | Surfynol 440 (HL8 value = 8) | | | 0.9% | | | | | | | | |
| | Surfynol 465 (HLB value = 13) | | | | 0.9% | | | | | | | |
| | BYK-348 (HLB value = 13) | | | | | | 0.3% | | | | | |
| | Diethanolamine | | | | | | | | | | | |
| | Methyldiethanolamine | | | | | | | | | | | |
| | Triethanolamine | | 1.0% | 1.0% | 1.0% | 1.0% | 1.0% | 1.0% | 1.0% | 1.0% | 1.0% | 1.0% |
| | Water | | 44.1% | 44.1% | 54.1% | 44.1% | 43.1% | 41.1% | 54.1% | 38.1% | 54.1% | 44.1% |
| Evaluation results | Evaluation 4 | Storage stability | B | B | B | A | B | A | A | B | B | B |
| | Evaluation 6 | Color difference | A | B | C | A | A | A | A | A | A | B |

<Evaluation 6: Evaluation of Color Difference>

A plurality of yellow ink coated matters having different recording media were prepared for each of the water-based yellow inks 35 to 58 obtained above in the same manner as in the method for preparing the yellow ink coated matter described above except for using the recording media shown below. Next, for all yellow ink coated matters, the hue (L* value, a* value, and b* value) was measured using i1Pro2 manufactured by X-Rite Inc. under the conditions of a light source D50, a view angle 2°, and a CIE color system. Next, for each of the water-based yellow inks 35 to 58, the difference between the L* value, a* value, and b* value obtained by the measurement using the yellow ink coated matters (the difference between the two types of coated matters having different recording media; ΔL*, Δa*, and Δb*, respectively) was calculated, and the color difference ΔE was further calculated by formula (12) shown below.

$$\Delta E = \sqrt{(\Delta L^{*2} + \Delta a^{*2} + \Delta b^{*2})} \quad \text{Formula (12):}$$

The color difference ΔE was calculated for each of the water-based yellow ink 35 to 58 for all combinations of the yellow ink coated matters, and the maximum value of the color difference ΔE was compared to evaluate the difference in hues of the yellow ink coated matters caused by the different recording media. The evaluation criteria were as follows, and evaluations of A, B, and C were determined as a practically usable level.

A: The maximum value of ΔE was less than 1.0.
B: The maximum value of ΔE was 1.0 or more but less than 2.0.
C: The maximum value of ΔE was 2.0 or more but less than 3.0.
D: The maximum value of ΔE was more than 3.0.

<Recording Medium Used in Evaluation 6>
Coated paper: UPM Finesse Gloss paper manufactured by UPM Corporation
Plain paper: NPI-70 paper manufactured by Nippon Paper Industries Co., Ltd.
Polyvinyl chloride sheet: MD-5 manufactured by Metamark Ltd.

It was confirmed that yellow inks, such as yellow inks 38, 40 and 42 to 43, which contained two or more types selected from the group consisting of 1,2-propanediol, 1,2-butanediol, 1,2-pentanediol, and 1,2-hexanediol as the water-soluble organic solvent, and had a total amount thereof of 10 to 30% by mass of the total mass of the yellow ink has a small color difference ΔE and excellent storage stability even if any recording medium is used.

Further, the yellow inks 43, 45 to 48 and the yellow inks 49 to 52 were evaluated by changing an HLB value of the surfactant. As a result, it has been found that even if any of C. I. Pigment Yellow 139 or 185 is used as the yellow pigment (A), by using the surfactant having an HLB value of 8 or less, particularly preferably 6 or less, the change in the hue caused by the recording medium can be suppressed to a small extent.

The yellow inks 53 to 56 were evaluated for the influence on the quality of the yellow ink when the olefin resin microparticles were used as the binder resin. The acid value/amine value ratio represented by formula (8) above was 0.53% $10^{-4}$, $1.6 \times 10^{-4}$, $9.9 \times 10^{-4}$, or $14.5 \times 10^{-4}$, respectively. As a result of the evaluation, in comparison with the yellow ink 49 which did not contain the olefin resin microparticles, it was confirmed that the storage stability was improved in the yellow inks 54 and 55 in which the acid value/amine value ratio were $1.5 \times 10^{-4}$ to $10 \times 10^{-4}$.

Examples 44 to 52, and Comparative Examples 16 to 18

Subsequently, in order to confirm the color reproducibility of the red region, an ink set composed of a yellow ink and a magenta ink was prepared, and the chroma Cm, the image density (OD value), and the spectral reflectance in the wavelength region of 380 to 480 nm were evaluated.

<Production of Yellow Inks 59 to 63>

Yellow inks 59 to 63 having the compositions shown in Table 5 were produced in the same manner as in the water-based yellow inks 1 to 13.

TABLE 5

| | | | | 59 | 60 | 61 | 62 | 63 |
|---|---|---|---|---|---|---|---|---|
| Yellow ink composition | Yellow pigment dispersion (Amount of pigment: 20%) | Pigment dispersion 1 | P.Y.12 | | | 15.0% | | |
| | | Pigment dispersion 3 | P.Y.74 | | | | 15.0% | |
| | | Pigment dispersion 7 | P.Y.139* | 15.0% | | | | |
| | | Pigment dispersion 10 | P.Y.185* | | 15.0% | | | |
| | | Pigment dispersion 11 | P.Y.213 | | | | | 15.0% |
| | Binder resin | JE-1056 | | 9.0% | 9.0% | 9.4% | 9.0% | 9.0% |
| | Organic solvent | Propylene glycol | | 10.0% | 10.0% | 10.0% | 10.0% | 10.0% |
| | | 1,2-Butanediol | | 10.0% | 10.0% | 10.0% | 10.0% | 10.0% |
| | Surfactant | Surfynol 104E | | 1.0% | 1.0% | 1.0% | 1.0% | 1.0% |
| | Basic organic compound (B) | Triethanolamine | | 0.8% | 0.8% | 0.8% | 0.8% | 0.8% |
| | | Water | | 54.2% | 54.2% | 53.8% | 54.2% | 54.2% |

<Production of Magenta Ink 1>

To a mixing container equipped with a stirrer, 20 parts of Ink Jet Magenta E-S(C. I. Pigment Red 122) manufactured by Clariant AG, 36 parts of the varnish of the pigment dispersing resin 1, and 44 parts of water were added and pre-dispersed with the stirrer, and then, the main dispersion was carried out for 2 hours using a Dyno-Mill having a volume of 0.6 L filled with 1,800 g of zirconia beads having a size of 0.5 mm to obtain a magenta pigment dispersion 1.

To another mixing container equipped with a stirrer, 30 parts of the magenta pigment dispersion 1, 10 parts of propylene glycol, 10 parts of 1,2-butanediol, 9 parts of JE-1056 (solid fraction: 42.5%, particle size: 50 nm) which is a resin emulsion manufactured by SEIKO PMC CORPORATION, 1 part of Surfynol 104E, and 54 parts of water were added while stirring, and mixed for 1 hour. Then, filtration was carried out with a membrane filter with a pore size of 1 μm to remove coarse particles to obtain a magenta ink 1.

<Production of Magenta Inks 2 to 8>

The magenta pigment dispersions 2 to 8 were produced in the same manner as in the magenta pigment dispersion 1 except that the types of pigments were changed as shown in Table 6. Then, the magenta inks 2 to 8 was produced in the same manner as in the magenta ink 1 except that the magenta pigment dispersion 1 was changed to the magenta pigment dispersions 2 to 8.

TABLE 6

| Magenta ink | Pigment |
|---|---|
| Magenta ink 1 (PR122 dispersion) | Ink Jet Magenta E-S |
| Magenta ink 2 (PR 146 dispersion) | Permanent Carmine FBB02 |
| Magenta ink 3 (PR147 dispersion) | Permanent Pink F3B |
| Magenta ink 4 (PR150 dispersion) | Toshiki Red 150TR |
| Magenta ink 5 (PR185 dispersion) | Graphto; Carmine HF4C |
| Magenta ink 6 (PR264 dispersion) | Irgazin Rubin L 4025 |
| Magenta ink 7 (PR266 dispersion) | Naphthol Red 4B 7035C |
| Magenta ink 8 (PR269 dispersion) | TCR 26901 |

<Production of Over Coated Matter (Red Coated Matter) of Magenta Ink and Yellow Ink>

The magenta inks and the yellow inks obtained above were combined as shown in Table 7, and coated matters (red coated matters) were produced using the method described below. First, each of the magenta inks 1 to 8 obtained above was applied on UPM Finesse Gloss paper manufactured by UPM Corporation, and coating was performed by using K control coater K202 manufactured by Matsuo Sangyo Co., Ltd., and wire bar No. 1 (wet thickness of coating: 6 μm), and then dried in an oven at 80° C. for 1 minute or more to produce magenta ink coated matters.

Then, the yellow inks 59 to 60 were applied so as to overlap the magenta ink coating film and to form the combinations described in Table 4. The apparatus used for coating was the same as that used for the production of the magenta ink coated matters. After coating, the coated matters were dried in an oven at 80° C. for 1 min or more to produce coated matters (red coated matters) in which the magenta ink and the yellow ink were layered.

In producing the red coated matters, the printing order of black→cyan→magenta→yellow, which is generally used in industrial single-pass inkjet printers, was taken into consideration.

The hue angle ∠Hm° of each of the magenta ink coated matters obtained above was measured using the same manner as in the yellow ink coated matter, and the hue angle ∠Hm° of the coated matter formed using each of the magenta ink 1, 3 or 8 was 330 to 360°, and the hue angle ∠Hm° of the coated matter formed using each of the magenta ink 2, 4, 5 or 7 was 0 to 45°.

Color 2007 ($C_{STD}$=81.9) and equal to or higher than the chroma of the standard color in Fogra 39 ($C_{STD}$=83.2).

B: The chroma Cm of the red coated matter was equal to or higher than the chroma of the standard color in Japan Color 2007 ($C_{STD}$=81.9), but lower than the chroma of the standard color in Fogra 39 ($C_{STD}$=83.2).

C: The chroma Cm of the red coated matter was lower than the chroma ($C_{STD}$=81.9) of the standard color in Japan Color 2007.

<Evaluation 8: Measurement of Spectral Reflectance of Red Coated Matter>

The spectral reflectance in the wavelength region of 380 to 480 nm of each of the red coated matters obtained by the same method as in Evaluation 2 above was measured in every 10 nm. It is preferable that the spectral reflectance is 5% or less in the entire wavelength region above from the viewpoint of the color reproducibility.

As a result of the evaluation, it was confirmed that a printed matter with excellent color reproducibility and high

TABLE 7

|  |  |  |  | Example | | | | | | | | | Comparative example | | |
|---|---|---|---|---|---|---|---|---|---|---|---|---|---|---|---|
|  |  |  |  | 44 | 45 | 46 | 47 | 48 | 49 | 50 | 51 | 52 | 16 | 17 | 18 |
| Ink set | Inks contained in Ink set | Yellow ink | No. | 59 | 60 | 60 | 60 | 60 | 60 | 60 | 60 | 60 | 61 | 62 | 63 |
|  |  |  | Pigment | P.Y.139 | P.Y.185 | P.Y.185 | P.Y.185 | P.Y 185 | P.Y.185 | P.Y.185 | P.Y.185 | P.Y.185 | P.Y.12 | P.Y.74 | P.Y.213 |
|  |  | Magenta ink | No. | 1 | 1 | 2 | 3 | 4 | 5 | 6 | 7 | 8 | 1 | 1 | 1 |
|  |  |  | Pigment | P.R.122 | P.R.122 | P.R.146 | P.R.147 | P.R.150 | P.R.185 | P.R.284 | P.R.266 | P.R.269 | P.R.122 | P.R.122 | P.R.122 |
| Evaluation results | Evaluation 7 | Chroma Cm | Calculated value | 85.1 | 86.2 | 85.3 | 86.5 | 87.2 | 85.9 | 86.8 | 87.0 | 85.4 | 79.6 | 75.9 | 75.3 |
|  |  |  | Evaluation | A | A | A | A | A | A | A | A | A | C | C | C |
|  | Evaluation 8 | Image density (OD value) |  | 1.54 | 1.58 | 1.65 | 1.68 | 1.70 | 1.55 | 1.58 | 1.62 | 1.52 | 1.39 | 1.27 | 1.31 |
|  |  | Spectral reflectance (%) | 380 nm | 1.2 | 2.7 | 1.0 | 1.0 | 0.8 | 1.2 | 1.5 | 1.0 | 1.5 | 2.5 | 3.8 | 3.5 |
|  |  |  | 390 nm | 1.2 | 2.5 | 1.0 | 1.0 | 0.8 | 1.2 | 1.5 | 1.0 | 1.5 | 2.5 | 3.7 | 3.0 |
|  |  |  | 400 nm | 1.2 | 2.6 | 1.0 | 1.0 | 0.8 | 1.2 | 1.5 | 1.0 | 1.5 | 2.6 | 3.8 | 3.0 |
|  |  |  | 410 nm | 1.4 | 2.7 | 1.0 | 1.0 | 0.8 | 1.2 | 1.5 | 1.0 | 1.5 | 3.0 | 4.1 | 3.2 |
|  |  |  | 420 nm | 1.6 | 2.7 | 1.2 | 1.0 | 0.9 | 1.4 | 1.6 | 1.5 | 1.5 | 3.1 | 4.3 | 3.5 |
|  |  |  | 430 nm | 1.6 | 2.8 | 1.4 | 1.0 | 1.0 | 1.7 | 1.8 | 1.8 | 2.0 | 3.3 | 4.5 | 4.2 |
|  |  |  | 440 nm | 1.7 | 2.8 | 1.4 | 1.2 | 1.0 | 1.8 | 1.9 | 1.8 | 2.4 | 3.4 | 4.7 | 5.6 |
|  |  |  | 450 nm | 1.8 | 2.6 | 1.6 | 1.5 | 1.0 | 1.8 | 2.0 | 1.9 | 2.6 | 3.5 | 4.8 | 8.0 |
|  |  |  | 460 nm | 1.9 | 2.7 | 1.8 | 1.6 | 1.2 | 1.9 | 2.4 | 2.0 | 2.8 | 4.0 | 5.4 | 12.4 |
|  |  |  | 470 nm | 2.1 | 3.1 | 2.0 | 1.8 | 1.6 | 2.2 | 3.0 | 2.2 | 3.0 | 4.6 | 6.2 | 19.3 |
|  |  |  | 480 nm | 2.8 | 3.6 | 2.5 | 2.0 | 1.8 | 2.9 | 3.3 | 2.5 | 3.9 | 5.1 | 6.2 | 29.5 |

As described below, the hue was evaluated for the red coated matters obtained above.

<Evaluation 7: Measurement of Hue and Image Density of Red Coated Matter>

The hue and the image density of each of the red coated matters obtained above was measured using i1Pro2 manufactured by X-Rite Inc. under conditions of a light source D50, a view angle 2°, and a CIE color system. The chroma of the red coated matter (referred to as Cm) was calculated from the obtained a* and b* by using formula (11) described above. Next, the obtained chroma Cm was compared with the chroma of the red standard color in Japan Color 2007 and Fogra 39 (hereinafter referred to as $C_{STD}$) to evaluate the color reproducibility of the red coated matter. The evaluation criteria for the chroma C were as follows, and evaluations of A and B were determined as a practically usable level. The image density (OD value) is preferably 1.2 or more, and particularly preferably 1.4 or more.

A: The chroma Cm of the red coated matter was equal to or higher than the chroma of the standard color in Japan image density can be obtained by combining the yellow ink according to an embodiment of the present invention with a magenta ink containing a quinacridone pigment. On the other hand, it has been found that the chroma is greatly inferior when the yellow ink containing no yellow pigment (A) is used.

In general, since the quinacridone pigment used in the magenta ink above has reflection in the wavelength region of 380 to 480 nm, the red color reproduction region overlayered with the yellow ink tends to be narrowed. However, by combining with the yellow ink according to an embodiment of the present invention, as described above, a printed matter having excellent color reproducibility in the red region and image density can be obtained.

Further, when the yellow ink according to an embodiment of the present invention is combined with a magenta ink containing a magenta pigment having a partial structure represented by general formula (2), a printed matter with excellent color reproducibility and high image density was able to be obtained as in the case of the magenta ink containing the quinacridone pigment.

Examples 53 to 68, and Comparative Examples 21 to 22

Subsequently, in order to confirm the reproducibility of various standard colors, cyan inks and violet inks were further produced and combined with the yellow inks and the magenta inks obtained above to evaluate the hue of color patch printed matters.

<Production of Cyan Ink 1>

To a mixing container equipped with a stirrer, 20 parts of LIONOGEN BLUE FG-7358 (C.I. Pigment Blue 15:3) manufactured by Toyo Color Co., Ltd., 30 parts of the varnish of the pigment dispersing resin 1, and 50 parts of water were added and pre-dispersed with a stirrer, then, the main dispersion was carried out for 2 hours using a Dyno-Mill having a volume of 0.6 L filled with 1,800 g of zirconia beads having a size of 0.5 mm to obtain a cyan pigment dispersion 1.

To another mixing container equipped with a stirrer, 15 parts of the cyan pigment dispersion 1, 10 parts of propylene glycol, 10 parts of 1,2-butanediol, 9 parts of JE-1056 (solid fraction: 42.5%, particle size: 50 nm) which is a resin emulsion manufactured by SEIKO PMC CORPORATION, 1 part of Surfynol 104E, 0.8 parts of triethanolamine, and 54.2 parts of water were added while stirring, and mixed for 1 hour. Then, filtration was carried out with a membrane filter having a pore size of 1 μm to remove coarse particles to obtain a cyan ink 1.

<Production of Cyan Ink 2 and Violet Inks 1 to 4>

Cyan pigment dispersion 2 and violet pigment dispersions 1 to 4 were produced in the same manner as in the cyan pigment dispersion 1 except that the types of pigments were changed as shown in Table 8. Then, cyan inks 1 to 3 and violet inks 1 to 4 having the compositions shown in Table 9 were produced.

TABLE 8

Table 8

| Cyan/violet pigment dispersion | Pigment |
|---|---|
| Cyan pigment dispersion 1 (PB 15:3 dispersion) | LIONOGEN BLUE FG-7358G |
| Cyan pigment dispersion 2 (PB15:6 dispersion) | LIONOL BLUE ES |
| Violet pigment dispersion 1 (PV3 dispersion) | Seika light Violet B800 |
| Violet pigment dispersion 2 (PV23 dispersion) | Hostaperm Violet RL 02 |
| Violet pigment dispersion 3 (PV27 dispersion) | Fanal Violet D6140 |
| Violet pigment dispersion 4 (PV32 dispersion) | Novoperm Bordeaux HF3R |

TABLE 9

| | | | Cyan ink No. | 1 | 2 | 3 | 4 | | | | |
| | | | Violet ink No. | | | | | 1 | 2 | 3 | 4 |
|---|---|---|---|---|---|---|---|---|---|---|---|
| Ink composition | Cyan pigment dispersion 1 | P.B.15:3 | | | 5.0% | 10.0% | 15.0% | | | | |
| | Cyan pigment dispersion 2 | P.B.15:6 | | 15.0% | 10.0% | 5.0% | | | | | |
| | Violet pigment dispersion 1 | P.V.3 | | | | | | 15.0% | | | |
| | Violet pigment dispersion 2 | P.V.23 | | | | | | | 15.0% | | |
| | Violet pigment dispersion 3 | P.V.27 | | | | | | | | 15.0% | |
| | Violet pigment dispersion 4 | P.V.32 | | | | | | | | | 15.0% |
| | Binder resin | JE-1056 | | 9.0% | 9.0% | 9.0% | 9.0% | 9.0% | 9.0% | 9.0% | 9.0% |
| | Soluvent | Propylene glycol | | 10.0% | 10.0% | 10.0% | 10.0% | 10.0% | 10.0% | 10.0% | 10.0% |
| | | 1,2-Butanediol | | 10.0% | 10.0% | 10.0% | 10.0% | 10.0% | 10.0% | 10.0% | 10.0% |
| | Surfactant | Surfynol 104E | | 1.0% | 1.0% | 1.0% | 1.0% | 1.0% | 1.0% | 1.0% | 1.0% |
| | Basic organic compound (B) | Triethanolamine | | 0.8% | 0.8% | 0.8% | 0.8% | 0.8% | 0.8% | 0.8% | 0.8% |
| | Water | | | 54.2% | 54.2% | 54.2% | 54.2% | 54.2% | 54.2% | 54.2% | 54.2% |

<Production of Color Patch Printed Matter>

An inkjet discharge apparatus having four ink-jet heads (model: KJ4B-1200, design resolution: 600 dpi) manufactured by Kyocera Corporation on an upper part of a conveyor capable of conveying a substrate was prepared, the combinations of inks shown in Table 10 were used as an ink set, and the inks were filled from an upstream side so as to become a violet ink, a cyan ink, a magenta ink, and a yellow ink.

Then, after fixing UPM Finesse Gloss paper manufactured by UPM Corporation on the conveyor, the conveyor was driven at a speed of 50 m/min, and when passing through an installation part of the inkjet head, by discharging the violet ink, cyan ink, magenta ink, and yellow ink in the order under the printing conditions of 30 kHz of frequency and 600×600 dpi respectively, a color chart image was printed (an image in which patches of overlayered two types of inks included in each ink set with the print ratios varied in 10% steps were arranged for all combinations). Then, after printing, by quickly drying using an air oven at 70° C. for 3 minutes, a color patch printed matter was produced.

TABLE 10

|  |  |  |  | Example | | | | | | | | |
|---|---|---|---|---|---|---|---|---|---|---|---|---|
|  |  |  |  | 53 | 54 | 55 | 56 | 57 | 58 | 59 | 60 | 61 |
| Ink set | Inks contained in Ink set | Yellow ink | No. | 59 | 59 | 59 | 60 | 60 | 60 | 60 | 60 | 60 |
|  |  |  | Pigment | P.Y.139 | P.Y.139 | P.Y.139 | P.Y.185 | P.Y.185 | P.Y.185 | P.Y.185 | P.Y.185 | P.Y.185 |
|  |  | Magenta ink | No. | 4 | 4 | 4 | 5 | 5 | 5 | 5 | 2 | 3 |
|  |  |  | Pigment | P.R.150 | P.R.150 | P.R.150 | P.R.185 | P.R.185 | P.R.185 | P.R.185 | P.R.146 | P.R.147 |
|  |  | Cyan ink | No. | 1 | 2 | 3 |  |  |  |  | 2 | 2 |
|  |  |  | Pigment | P.B.15:6 | P.B.15:3 + P.B.15:6 | P.B.15:3 + P.B.15:6 |  |  |  |  | P.B.15:3 + P.B.15:6 | P.B.15:3 + P.B.15:6 |
|  |  | Violet ink | No. |  |  |  | 1 | 2 | 3 | 4 |  |  |
|  |  |  | Pigment |  |  |  | P.V.3 | P.V.23 | P.V.27 | P.V.32 |  |  |
| Evaluation results | Evaluation 9 Hue of color patch printed matter | Fogra-Magenta |  | A | A | A | A | A | A | A | A | A |
|  |  | Reflex-Blue |  | A | A | A | A | A | A | A | A | A |
|  |  | Pantone-Grn |  | A | A | A | A | A | A | A | A | A |
|  |  | Warm-Red |  | A | A | A | A | A | A | A | A | A |

|  |  |  |  | Example | | | | | | | Comparative example | |
|---|---|---|---|---|---|---|---|---|---|---|---|---|
|  |  |  |  | 62 | 63 | 64 | 65 | 66 | 67 | 68 | 21 | 22 |
| Ink set | Inks contained in Ink set | Yellow ink | No. | 60 | 60 | 60 | 60 | 60 | 3 | 60 | 61 | 62 |
|  |  |  | Pigment | P.Y.185 | P.Y.185 | P.Y.185 | P.Y.185 | P.Y.185 | P.Y.138 | P.Y.185 | P.Y.12 | P.Y.74 |
|  |  | Magenta ink | No. | 4 | 4 | 4 | 5 | 5 | 5 | 5 | 2 | 3 |
|  |  |  | Pigment | P.R.150 | P.R.185 | P.R.284 | P.R.86 | P.R.269 | P.R.122 | P.R.146 | P.R.150 | P.R.122 |
|  |  | Cyan ink | No. | 2 | 2 | 2 | 2 | 2 | 3 | 4 | 2 | 4 |
|  |  |  | Pigment | P.B.15:3 + P.B.15:6 | P.B.15:3 + P.B.15:6 | P.B.15:3 + P.B.15:6 | P.B.15:3 + P.B.15:6 | P.B.15:3 + P.B.15:6 | P.B.15:3 + P.B.15:6 | P.B.15:3 | P.B.15:3 + P.B.15:6 | P.B.15:3 |
|  |  | Violet ink | No. |  |  |  |  |  | 3 | 1 |  |  |
|  |  |  | Pigment |  |  |  |  |  | P.V.27 | P.V.3 |  |  |
| Evaluation results | Evaluation 9 Hue of color patch printed matter | Fogra-Magenta |  | A | A | A | A | A | A | A | B | B |
|  |  | Reflex-Blue |  | A | A | A | A | A | A | A | A | B |
|  |  | Pantone-Grn |  | A | A | A | A | A | A | A | A | A |
|  |  | Warm-Red |  | A | A | B | A | A | B | A | A | B |

As described below, the hue was evaluated for the color patch printed matters obtained above.

<Evaluation 9: Evaluation of Hue of Color Patch Printed Matter>

The hue of each of the color patch printed matters obtained above was measured using i1Pro2 manufactured by X-Rite Inc. under the conditions of a light source D50, a view angle 2°, and a CIE color system. The chroma Ce and the hue angle ∠Hm° of each color patch printed matter were calculated from the obtained a* and b*. The chroma Cc was calculated using formula (11) described above and the hue angle ∠Hm° was calculated using the formula described above. The hue angle ∠Hc° of each color patch was compared with the hue angle of each of the following standard colors, and the chroma Cc of the color patch having the smallest difference thereof was compared with the chroma of the standard color to evaluate the hue of color patch printed matter. In the three standard colors except for Warm-Red, evaluation of A was determined as a practically usable level.

A: The chroma Ce of the color patch having the smallest difference from the hue angle of the standard color was equal to or higher than the chroma of the standard color.

B: The chroma Cc of the color patch having the smallest difference from the hue angle of the standard color was smaller than the chroma of the standard color.

<Standard Color Used in Evaluation 9>

Fogra-Magenta: Magenta standard color in Fogra 39 (chroma=72.2, hue angle=356°)

Reflex-Blue: PANTONE Reflex Blue C standard color (chroma=74.0, hue angle=290°)

Pantone-Grn: PANTONE Green C standard color (chroma=76.4, hue angle=180°)

Warm-Red: PANTONE Warm Red C standard color (chroma=90.3, hue angle=39°)

As a result of the evaluation, it was confirmed that a printed matter having excellent reproducibility of each standard color described above can be produced by using an ink set including the yellow ink according to an embodiment of the present invention, a magenta ink, a cyan ink and/or a violet ink. In particular, in the case that the magenta ink contains a magenta pigment having a partial structure represented by general formula (2), and the cyan ink contains one type selected from the group consisting of C. I. Pigment Blue 15:3 and 15:6, the violet ink contains one type selected from the group consisting of C. I. Pigment Violet 3, 23, 27 and 32, or the case that satisfies both of them, it has been found that a printed matter with excellent color reproducibility can be obtained by using only 3 or 4 chromatic inks of the yellow ink, magenta ink, and the cyan ink and/or the violet ink. On the other hand, in the ink set using the yellow ink 61 or 62 which does not contain the yellow pigment (A), the magenta standard color in the Fogra 39 could not be reproduced, and the reproducibility of the PANTONE Warm Red C standard color belonging to the red region and the PANTONE Green C standard color belonging to the green region were also inferior.

The magenta inks 3 and 8 which contain a magenta pigment having the structure of general formula (2) and a hue angle ∠Hm° of the coated matter of 330 to 360°, have particularly excellent color reproducibility in the red region. On the other hand, magenta inks 2, 4, 5, and 7 which contain a magenta pigment having the structure of general formula (2) and hue angle ∠Hm° of the coated matter of 0 to 45°, have excellent overall color reproducibility (CMY or RGB).

The invention claimed is:

1. A water-based inkjet yellow ink comprising:
a yellow pigment (A) having a partial structure represented by general formula (1), an organic solvent, a basic organic compound, a binder resin, and water, wherein
an amount of the yellow pigment (A) is 1 to 10% by mass of a total mass of the water-based inkjet yellow ink;
the basic organic compound contains 0.1 to 1.25% by mass of a basic organic compound (B) having a pKa value of 9.5 or less at 25° C. of the total mass of the water-based inkjet yellow ink,
an amount of an organic solvent having a boiling point of 240° C. or higher under 1 atmosphere is 5% by mass or less of the total mass of the water-based inkjet yellow ink, and
the binder resin includes olefin resin microparticles, and
if an amine value of the yellow pigment (A) is Am (PA) [mgKOH/g], the amount of the yellow pigment (A) of the total mass of the water-based inkjet yellow ink is C (PA) [% by mass], an acid value of the olefin resin microparticles is Av (RO) [mgKOH/g], and an amount of the olefin resin microparticles of the total mass of the water-based inkjet yellow ink is C (RO) [% by mass], the acid value/amine value ratio represented by formula (8) shown below is $0.5 \times 10^{-4}$ to $15 \times 10^{-4}$,

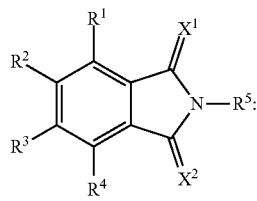

General formula (1)

wherein, general formula (1) has at least one bonding site, and
in general formula (1),
$X^1$ and $X^2$ represent both $=$O or both $=CR^6R^7$, or $X^1$ is $=$O and $X^2$ is $=NR^8$,
each $R^1$ to $R^4$ independently represents a hydrogen atom or a halogen atom,
$R^5$ represents a hydrogen atom or a bonding site,
each $R^6$ to $R^8$ represents a bonding site, and $$\text{Acid value/amine value ratio} = \{Av(RO) \times C(RO)\} \div \{Am(PA) \times C(PA)\} \quad \text{formula (8).}$$

2. The water-based inkjet yellow ink according to claim 1, wherein
an amount of the basic organic compound (B) having a pKa value of 9.5 or less at 25° C. is 0.1 to 1% by mass of the total mass of the water-based inkjet yellow ink.

3. The water-based inkjet yellow ink according to claim 1, wherein
the yellow pigment (A) includes C. I. Pigment Yellow 139 and/or C. I. Pigment Yellow 185.

4. The water-based inkjet yellow ink according to claim 1, wherein
an amount of impurities contained in the yellow pigment (A) is 5% by mass or less of a total mass of the yellow pigment (A).

5. A inkjet ink set comprising:
the water-based inkjet yellow ink according to claim 1, and
a water-based inkjet magenta ink containing magenta pigment and water.

* * * * *